(12) United States Patent
Iwatsu et al.

(10) Patent No.: US 7,844,259 B2
(45) Date of Patent: *Nov. 30, 2010

(54) COMMUNICATION METHOD

(75) Inventors: Takeshi Iwatsu, Kanagawa (JP);
Noriyuki Sakoh, Kanagawa (JP);
Shinsuke Yamashita, Kanagawa (JP);
Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 242 days.

This patent is subject to a terminal disclaimer.

(21) Appl. No.: 12/167,806

(22) Filed: Jul. 3, 2008

(65) Prior Publication Data

US 2008/0275954 A1 Nov. 6, 2008

Related U.S. Application Data

(63) Continuation of application No. 10/554,542, filed as application No. PCT/JP2004/007026 on May 18, 2004, now Pat. No. 7,430,410.

(30) Foreign Application Priority Data

| Jul. 14, 2003 | (JP) | ............................. 2003-274302 |
| Aug. 11, 2003 | (JP) | ............................. 2003-291741 |
| Sep. 4, 2003 | (JP) | ............................. 2003-313167 |
| Sep. 24, 2003 | (JP) | ............................. 2003-332564 |

(51) Int. Cl.
*H04M 3/42* (2006.01)
(52) U.S. Cl. ..................... 455/414.1; 705/51; 380/279
(58) Field of Classification Search ............. 455/414.1; 705/51; 380/279
See application file for complete search history.

(56) References Cited

U.S. PATENT DOCUMENTS 5,903,262 A 5/1999 Ichihashi et al.

(Continued)

FOREIGN PATENT DOCUMENTS

JP 10-163988 6/1998

(Continued)

OTHER PUBLICATIONS

Hiroshi Takahata, "Strongest tab browser Sleipnir extremely thorough, focusing on even the finest of details, Getting started No. 2 Let's master the basic skill of customizing and search", Net runner, Softbank publishing Co., Ltd., vol. 5, No. 1, Jan. 1, 2003, pp. 114-117 and 1 cover page.

(Continued)

*Primary Examiner*—Creighton Smith
(74) *Attorney, Agent, or Firm*—Oblon, Spivak, McClelland, Maier & Neustadt, L.L.P.

(57) ABSTRACT

According to the present invention, the step of requesting of an associated information provision server KS for associated information about contents broadcast in a broadcast program being received is provided. The step of acquiring the associated information corresponding to the request from the associated information provision server KS and storing this is provided. And the retrieval step of transmitting a part of the associated information as a retrieval key to retrieve contents to a CD seller server 31, and obtaining retrieval results from the CD seller server 31 is provided. Thereby, the associated information about the contents broadcast in the broadcast program being received is obtained. The retrieval results are obtained from a contents retrieval server by using the part of the associated information as retrieval keys. Therefore, retrieval results having variety that are not limited to results conceived by the user in a certain degree can be obtained.

6 Claims, 23 Drawing Sheets

U.S. PATENT DOCUMENTS

| | | | |
|---|---|---|---|
| 6,075,527 | A | 6/2000 | Ichihashi et al. |
| 6,552,254 | B2 | 4/2003 | Hasegawa et al. |
| 6,570,080 | B1 | 5/2003 | Hasegawa et al. |
| 6,622,174 | B1 * | 9/2003 | Ukita et al. ............... 709/246 |
| 6,823,454 | B1 * | 11/2004 | Hind et al. ............... 713/168 |
| 7,146,009 | B2 * | 12/2006 | Andivahis et al. .......... 380/277 |
| 2001/0018742 | A1 | 8/2001 | Hirai |
| 2001/0037256 | A1 | 11/2001 | Yazawa |
| 2002/0026867 | A1 | 3/2002 | Hasegawa et al. |
| 2002/0069419 | A1 | 6/2002 | Raverdy et al. |
| 2002/0124263 | A1 | 9/2002 | Yokomizo |
| 2002/0143705 | A1 | 10/2002 | Kaars |
| 2002/0184096 | A1 * | 12/2002 | Kawahara et al. ............ 705/14 |
| 2003/0105669 | A1 * | 6/2003 | Tsuchiya .................. 705/14 |
| 2003/0177198 | A1 * | 9/2003 | Yabe et al. ............... 709/217 |
| 2003/0187682 | A1 * | 10/2003 | Ozawa et al. ............... 705/1 |
| 2003/0208560 | A1 * | 11/2003 | Inoue et al. ............... 709/219 |
| 2003/0220091 | A1 | 11/2003 | Farrand et al. |
| 2004/0064524 | A1 | 4/2004 | Van Steenbergen et al. |
| 2004/0121723 | A1 | 6/2004 | Poltorak |
| 2006/0014523 | A1 | 1/2006 | Reilly |

FOREIGN PATENT DOCUMENTS

| | | |
|---|---|---|
| JP | 2000-222360 | 8/2000 |
| JP | 2001-125914 | 5/2001 |
| JP | 2001-249940 | 9/2001 |
| JP | 2001-251606 | 9/2001 |
| JP | 2001-350480 | 12/2001 |
| JP | 2001-356779 | 12/2001 |
| JP | 2002-64808 | 2/2002 |
| JP | 2002-92360 | 3/2002 |
| JP | 2002-135671 | 5/2002 |
| JP | 2002-142210 | 5/2002 |
| JP | 2002-518720 | 6/2002 |
| JP | 2002-358283 | 12/2002 |
| JP | 2003-51798 | 2/2003 |
| JP | 2003-92556 | 3/2003 |
| JP | 2003-204539 | 7/2003 |
| JP | 2003-249906 | 9/2003 |
| JP | 2004-530963 | 10/2004 |

OTHER PUBLICATIONS

Hiroshi Yuki, "EnjoyPerlProgramming Let's utilize a module No. 18 YukiWiki2", Cmagazine, Softbank publishing Co., Ltd, vol. 14, No. 7, Jul. 1, 2002, pp. 79-85 and 1 cover page.

"How the West Was Won", Amazon.co.jp: Music, Internet <URL:http://web.archive.org/web/20030605172230/amazon.co.jp/exec/obidos/ASIN/B00008OWZC/ref=ed_best_h_2_3/>, Jun. 5, 2003 Internet archive received, [Aug. 10, 2009 Searched], 3 pages.

"Harry Potter (Book 5) UK version Harry Potter and the Order of the Phoenix", Amazon.co.jp: Foreign book:, Internet URL:http://web.archive.org/web/20030618181546/amazon.co.jp/exec/obidos/ASIN/0747551006/ref=ac_h100_fb_lis:_2/, Jun. 18, 2003 Internet archive received, [Aug. 10, 2009 searched], 3 pages.

* cited by examiner

COMMUNICATION METHOD

CROSS REFERENCE TO RELATED APPLICATIONS

This application is a continuation of and claims the benefit of priority from U.S. Ser. No. 10/554,542, filed on Oct. 25, 2005, which is a continuation of PCT Application No. PCT/JP04/07026 filed May 18, 2004, which claims the benefit of priority from Japanese Patent Application Nos. 2003-274302, filed Jul. 14, 2003, 2003-291741, filed Aug. 11, 2003, 2003-313167, filed Sep. 4, 2003 and 2003-332564, filed Sep. 24, 2003.

TECHNICAL FIELD

The present invention relates to a communication method for appropriately searching for desired contents by a contents retrieval server, for example.

BACKGROUND ART

Conventionally, radio receivers are used for audio stereo reproduction systems such as all-in-one stereo systems and separate stereo components, portable audio systems, car-mounted audio systems. The radio receiver receives and demodulates broadcast signals broadcast from a radio station and allows users to listen to programs and musical compositions.

On the other hand, the radio station publicizes various information about its programs on the Internet home page, and as well as the broadcasting of the programs, provides musical composition information about musical compositions broadcast in the programs such as their titles and artist names, to the audiences as associated information.

There is proposed an audio reproduction apparatus as a client terminal having the radio reception function and the Internet connection function implemented in one system that simultaneously performs listening of radio programs and acquisition of musical composition information (see Patent Document 1, for example).

This audio reproduction apparatus allows a user to listen to a program from the above audio reproduction apparatus and acquire the contents of musical compositions broadcast in the program from the radio station, and acquire musical composition information such as the titles and the artist names related to the above musical compositions from a predetermined associated information provision server.

Patent Document 1—Patent Application No. 2003-274302

The audio reproduction apparatus transmits for example the title or the artist name in the associated information obtained from the associated information provision server to a CD seller server, gets the CD searched based on the title or the artist name by the above CD seller server, and can receive the retrieval result from the CD seller server.

By the way, in the aforementioned audio reproduction apparatus, the association information to be transmitted to the CD seller server is limited to the title and the artist name. The retrieval result by the CD seller server is about CDs having that title and CDs containing the same artist name. The retrieval result has no variety, and there has been a problem that a desired CD cannot be always searched.

DESCRIPTION OF THE INVENTION

Considering the above point, the present invention has been done and provides a communication method in which retrieval results having variety based on associated information can be easily obtained.

To solve the above problem, in a communication method according to the present invention, the request step of requesting of an associated information provision server for associated information about contents broadcast in a broadcasting program being received, the associated information acquisition step of acquiring the associated information corresponding to the request from the associated information provision server, and storing the associated information in storage means, and the search step of transmitting a part of the associated information as retrieval keys for searching for the contents to a contents retrieval server, and obtaining retrieval results from the contents retrieval server, are provided.

The associated information about the contents broadcast in a broadcasting program being received is acquired, and a part of the associated information is used as retrieval keys to obtain retrieval results in the contents retrieval server. Thereby, retrieval results having variety that are not limited to results conceived by the user in a certain degree can be obtained.

In a communication terminal apparatus according to the present invention, request means for requesting of an associated information provision server for associated information about contents broadcast in a broadcasting program being received, associated information acquisition means for acquiring the associated information corresponding to the request from the associated information provision server, and storing the associated information in storage means, and search means for transmitting a part of the associated information as retrieval keys for contents retrieval to a contents retrieval server, and obtaining retrieval results from the contents retrieval server, are provided.

The associated information about the contents broadcast in a broadcasting program being received is acquired, and a part of the associated information is used as retrieval keys to obtain retrieval results in the contents retrieval server. Thereby, retrieval results having variety that are not limited to results conceived by the user in a certain degree can be obtained.

Further, a communication program according to the present invention makes an information processing apparatus execute the request step of requesting of an associated information provision server for associated information about contents broadcast in a broadcasting program being received, the associated information acquisition step of acquiring the associated information corresponding to the request from the associated information provision server, and storing the associated information in storage means, and the search step of transmitting a part of the associated information as retrieval keys for searching for the contents to a contents retrieval server, and obtaining retrieval results from the contents retrieval server.

The associated information about the contents broadcast in a broadcasting program being received is acquired, and a part of the associated information is used as retrieval keys to obtain retrieval results in the contents retrieval server. Thereby, retrieval results having variety that are not limited to results conceived by the user in a certain degree can be obtained.

Further, in a communication method according to the present invention, a first server receives a request signal to request associated information about contents broadcast in a broadcasting program being received, from a broadcast receiving apparatus together with user information, authorizes the user information. If the authentication of the user information is permitted, the first server transmits the associated information to the broadcast receiving apparatus. And a second server receives broadcasting station identification information being a part of the associated information as retrieval keys for contents retrieval, from the broadcast receiving apparatus. The second server retrieves information corresponding to the above retrieval keys from databases in storage media under the retrieval keys, and transmits the information as retrieval results to the broadcast receiving apparatus.

According to the present invention, the associated information about the contents broadcast in a broadcasting program being received is acquired, and a part of the associated information is used as retrieval keys to obtain retrieval results in the contents retrieval server. Thereby, a communication method, a communication terminal apparatus, and a communication program in that retrieval results having variety that are not limited to results conceived by the user in a certain degree can be obtained, can be realized.

BEST MODE FOR CARRYING OUT THE INVENTION

An embodiment of the present invention will be described in detail with reference to the accompanying drawings.

Figure 1:
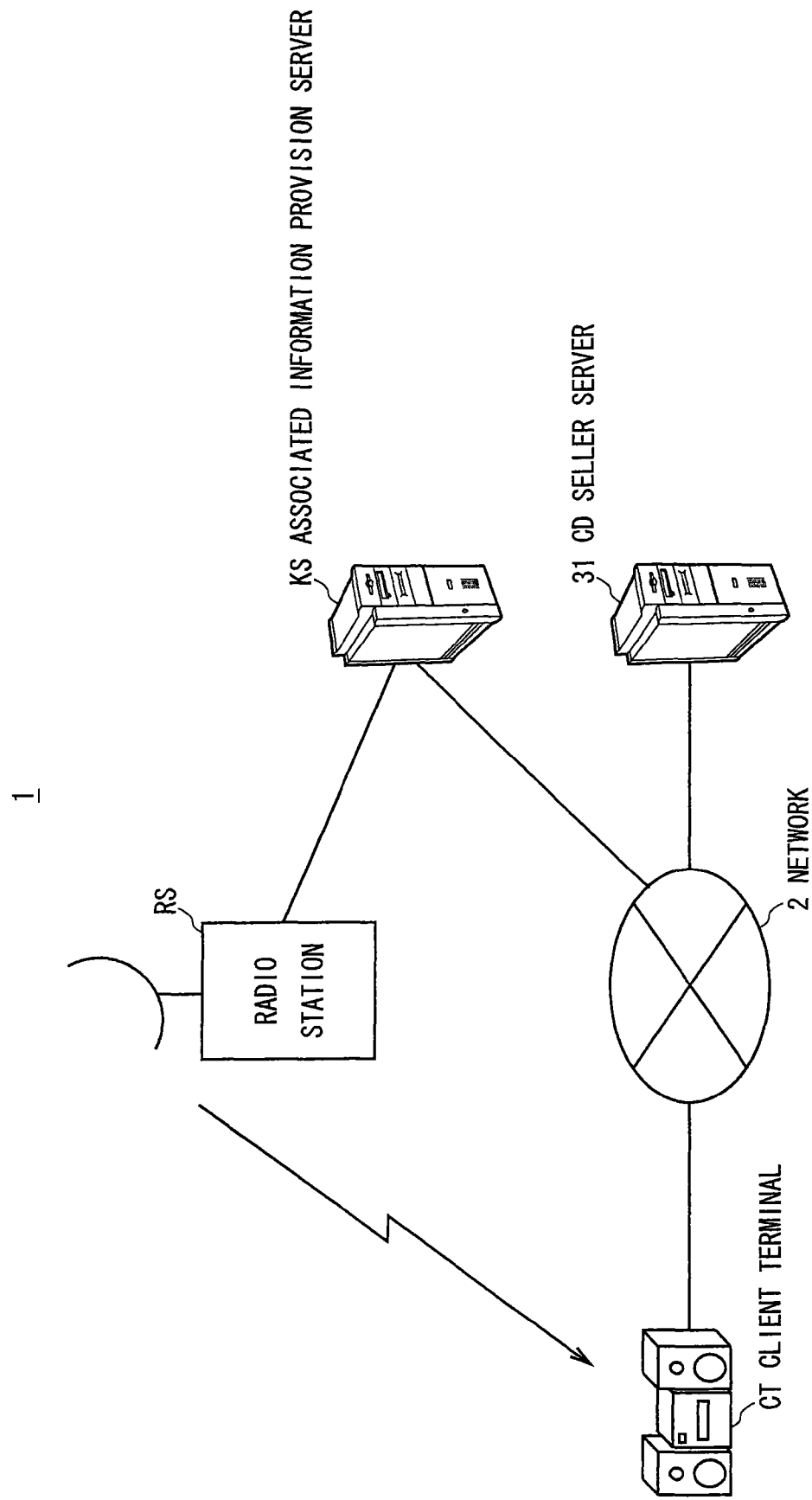
FIG. 1 is a schematic diagram showing the overall configuration of an information provision system according to the present invention.

(1) First Embodiment (1-1) Overall Configuration of Information Provision System As shown in FIG. 1, the reference numeral 1 denotes an information provision system constituting the present invention as a whole. A client terminal CT receives broadcast from a radio station RS.

In the information provision system 1, the radio station RS connects with an associated information provision server KS comprising a computer. A leased line is used for this connection. In place of the radio station RS, the associated information provision server KS provides a home page of the radio station RS. In response to an acquisition request from the client terminal CT, the associated information provision server KS can provide musical composition information as associated information about musical compositions broadcast from the radio station RS via a network 2 such as the Internet.

Furthermore, the information provision system 1 is connected to a compact disc (CD) seller server 31 via the network 2. Based on a retrieval key transmitted from the client terminal CT as a part of the associated information, the information provision system 1 retrieves a CD including a musical composition desired by the user of the above client terminal CT, and provides the retrieval result to the client terminal CT via the network 2.

When the user performed the procedure to purchase the desired CD from the above CD seller server 31 by a shopping based on the retrieval result provided from the CD seller server 31, the client terminal CT transmits a proper CD number to specify the CD to the CD seller server 31.

The CD seller server 31 performs selling procedure to deliver the CD corresponding to the CD number received from the client terminal CT to the user's house, and also executes credit settlement processing.

"C"

(1-1) Configuration of Radio Station RS

Figure 2:
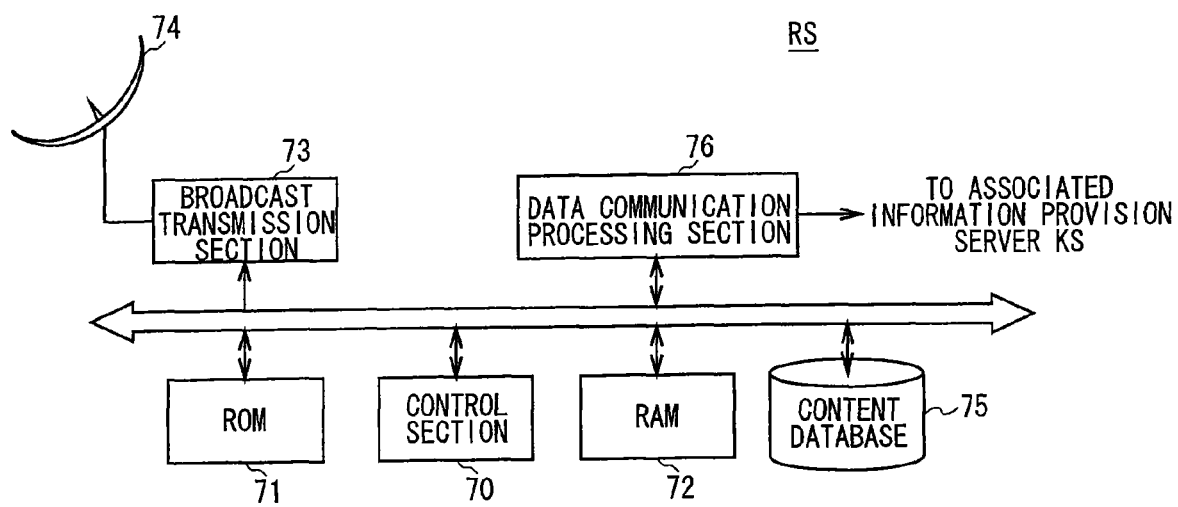
FIG. 2 is a schematic block diagram showing the configuration of a radio station.

As shown in FIG. 2, the radio station RS includes a control section 70 comprising a CPU (Central Processing Unit). The control section 70 uses a ROM (Read Only Memory) 71 and RAM (Random Access Memory) 72 to start basic programs such as an OS (Operating System) and various application programs. Based on these programs, the control section 70 controls the entire system in a unified fashion. The radio station RS performs processes such as program broadcasting to broadcast programs from a broadcast transmission section 73 to the client terminal CT via an antenna 74.

The radio station RS uses a content database 75 to store many contents such as previously recorded programs and musical compositions to be broadcast in the programs. The radio station RS broadcasts the program according to a program schedule and broadcasts musical composition contents in the program as needed.

In this case, the radio station RS uses a data communication processing section 76 to notify the associated information provision server KS that musical compositions are broadcast in the program. In addition, the radio station RS notifies the associated information provision server KS what program is currently being broadcast.

(1-1-2) Configuration of Associated Information Provision Server

Figure 3:
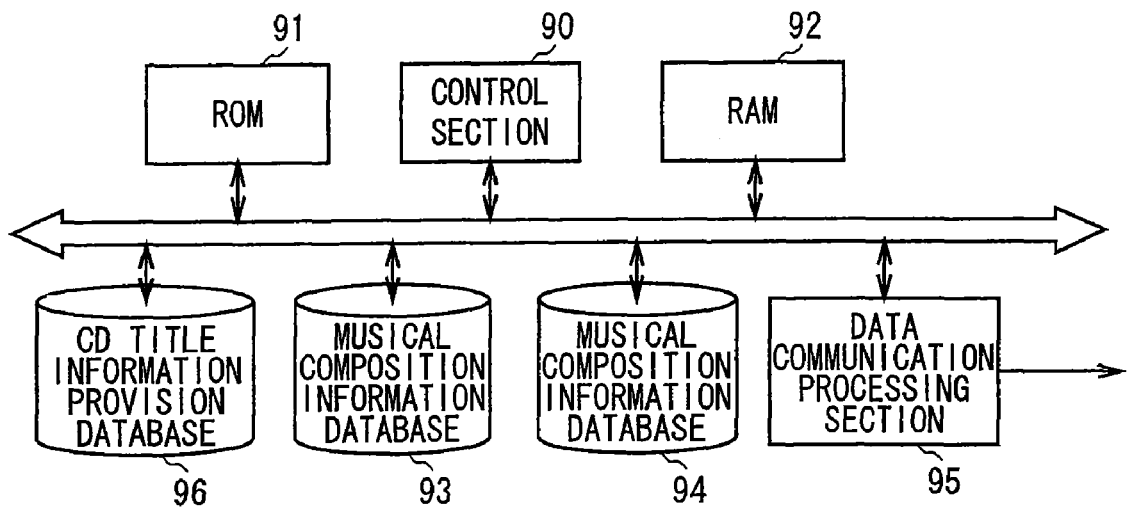
FIG. 3 is a schematic block diagram showing the configuration of an associated information provision server.

As shown in FIG. 3, the associated information provision server KS includes a control section 90 comprising a CPU. The control section 90 uses a ROM 91 and RAM 92 to start basic programs such as an OS and various application programs. Based on these programs, the associated information provision server KS performs overall control, specified operations, and the like.

The associated information provision server KS searches a musical composition information database 93 for musical composition information about musical compositions broadcast in a program by the radio station RS, for example. The associated information provision server KS provides the musical composition information as associated information to the client terminal CT via the data communication processing section 95.

Further, the associated information provision server KS searches a program information database 94 for program information about performers, a DJ name, genres, and the like associated with a program broadcast by the radio station RS. The associated information provision server KS provides the program information as associated information to the client terminal CT via the data communication processing section 95.

Furthermore, the associated information provision server KS stores a CD title information provision database 96 in which titles, artist names, genres, CD numbers, and the like about CDs being on sale are managed in a database. In response to a retrieval request from a client terminal CT, the associated information provision server KS provides the retrieval result of CDs based on a retrieval key to the client terminal CT.

(1-1-3) Configuration of CD Seller Server

Figure 4:
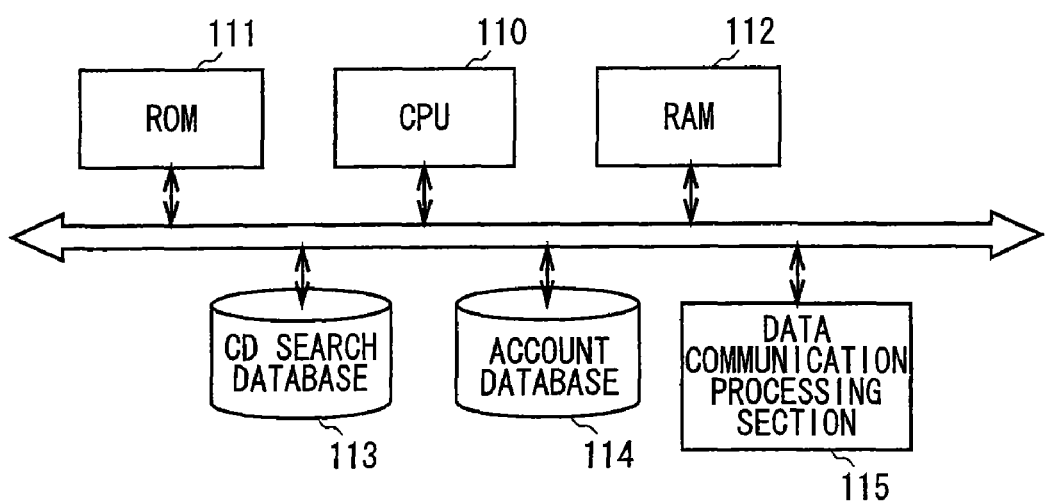
FIG. 4 is a schematic block diagram showing the configuration of a CD seller server.

As shown in FIG. 4, a CD seller server 31 includes a control section 110 comprising a CPU. The control section 110 uses a ROM 111 and RAM 112 to start basic programs such as an OS and various application programs. Based on these programs, the CD seller server 31 performs overall control, specified operations, and the like.

This CD seller server 31 retrieves a CD contain a music component desired by the user of the above client terminal CT by a CD retrieval database 113 based on the retrieval key transmitted from the client terminal CT, and provides a CD number being the retrieval result to the client terminal CT sequentially via a data communication processing section 115 and the network 2.

After that, if the procedure to purchase a CD corresponding to the above CD number by shopping is performed by the user via the client terminal CT, and the CD seller server 31 receives that CD number from the above client terminal CT, the CD seller server 31 executes credit settlement processing by an account database 114, as well as selling procedure to deliver the CD corresponding to the above CD number to the user's house.

(1-1-4) Circuit Configuration of Client Terminal CT

Figure 5:
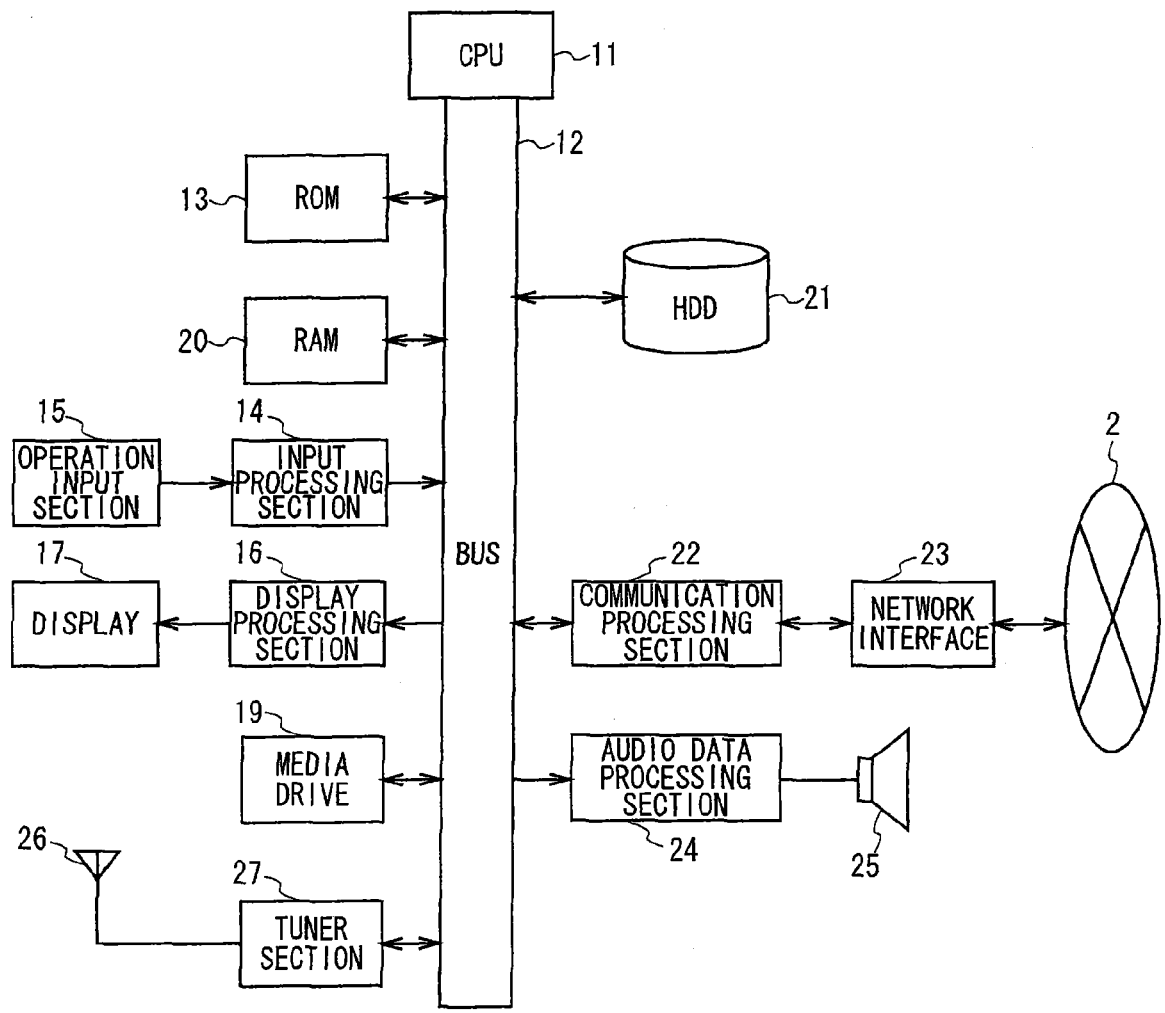
FIG. 5 is a schematic block diagram showing the circuit configuration of a client terminal.

As shown in FIG. 5, a CPU 11 of the client terminal CT reads basic programs such as an OS and various application programs from a ROM 13 connected via a bus 12 and expands the programs in a RAM 20. Based on these programs, the CPU 11 performs overall control, specified operations, and the like. For example, the CPU 11 performs communication operations via the network 2, input/output operations in relation to users, reproduction of contents from media, writing of contents downloaded from the radio station RS onto a hard disk drive (HDD) 21, management of contents, and the like.

An operation input section 15 sends input information to an input processing section 14. The input information corresponds to user operations for various operation devices provided on the surface of the main unit cabinet or a remote controller (not shown). The input processing section 14 applies specified processes to the input information and sends it as an operation command to the CPU 11. The CPU 11 performs processes corresponding to the operation command.

A display 17 represents a display device such as a liquid crystal display and may be directly attached to the surface of the main unit cabinet or may be externally connected. The display 17 displays processing results from the CPU 11 and the other various information.

A media drive 19 reproduces, for example, a CD (Compact Disc) player or a Memory Stick (registered trademark) comprising a flash memory and the like. An audio data processing section 24 digital-to-analog converts the reproduction result which is then output from a 2-channel speaker 25.

When the CPU 11 reproduces data, e.g., a musical composition's audio content via the media drive 19, the audio content can be stored as an audio data file in a hard disk drive 21.

Further, the CPU 11 uses the media drive 19 to read a plurality of still pictures stored in Memory Stick. These still pictures can be displayed as a slideshow on the display 17 via a display processing section 16.

In addition, the CPU 11 can randomly access and read a plurality of musical compositions stored in the hard disk drive 21 to reproduce the musical compositions in a user-specified order like a jukebox.

A tuner section 27 is equivalent to an AM or FM radio tuner, for example. The tuner section 27 demodulates a broadcast signal received at an antenna 26 under the control of the CPU 11. The result, as a broadcast audio, is passed to the audio data processing section 24 and is output from the speaker 25.

A communication processing section 22 encodes transmission data under the control of the CPU 11. The communication processing section 22 uses a network interface 23 to transmit data to external network-compliant devices via a network 2. The communication processing section 22 uses the network interface 23 to receive data from external network-compliant devices and decodes the received data. The communication processing section 22 then transfers the decoded data to the CPU 11.

(1-1-5) Directory Management of Contents

Figure 6:
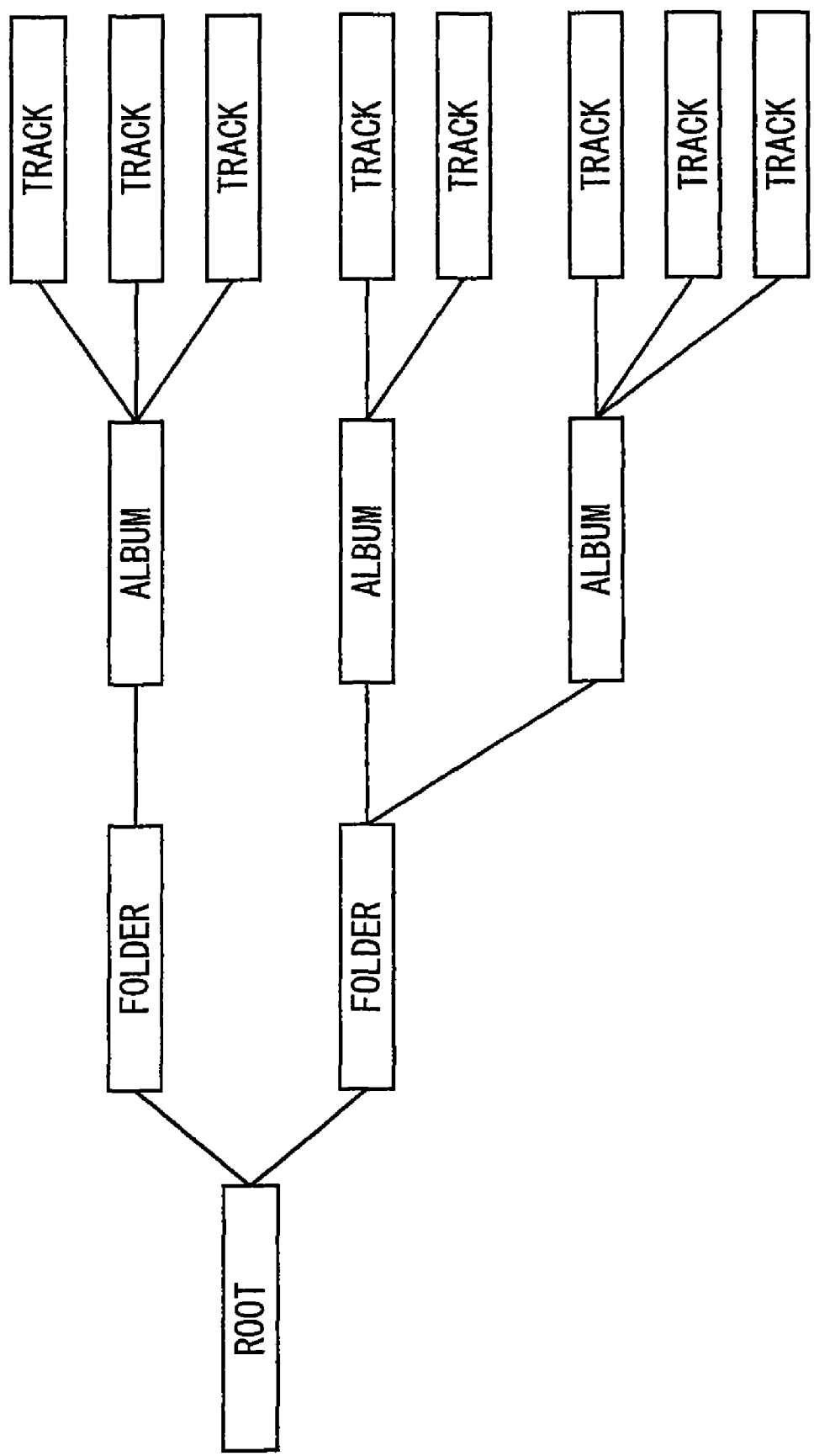
FIG. 6 is a schematic diagram for explaining directory management of contents.

The CPU 11 of the client terminal CT manages contents to be stored in the hard disk drive 21 according to directory structure as shown in FIG. 6. There are created any number of "folder" directories within a specified range under a "root" directory. The "folder" directory is created in accordance with a genre of contents, an owner user, and the like.

Under the "folder" directory, there are created any number of "album" directories within a specified range. The "album" directory corresponds to one album title, for example. The "album" directory stores one or more "track" files belonging to the "album" directory. That is to say, the "track" file is equivalent to one musical composition, i.e., a content.

A database file is stored in the hard disk drive 21 and is used for the directory management of contents.

(1-1-6) Program Module Configuration of Client Terminal CT

Figure 7:
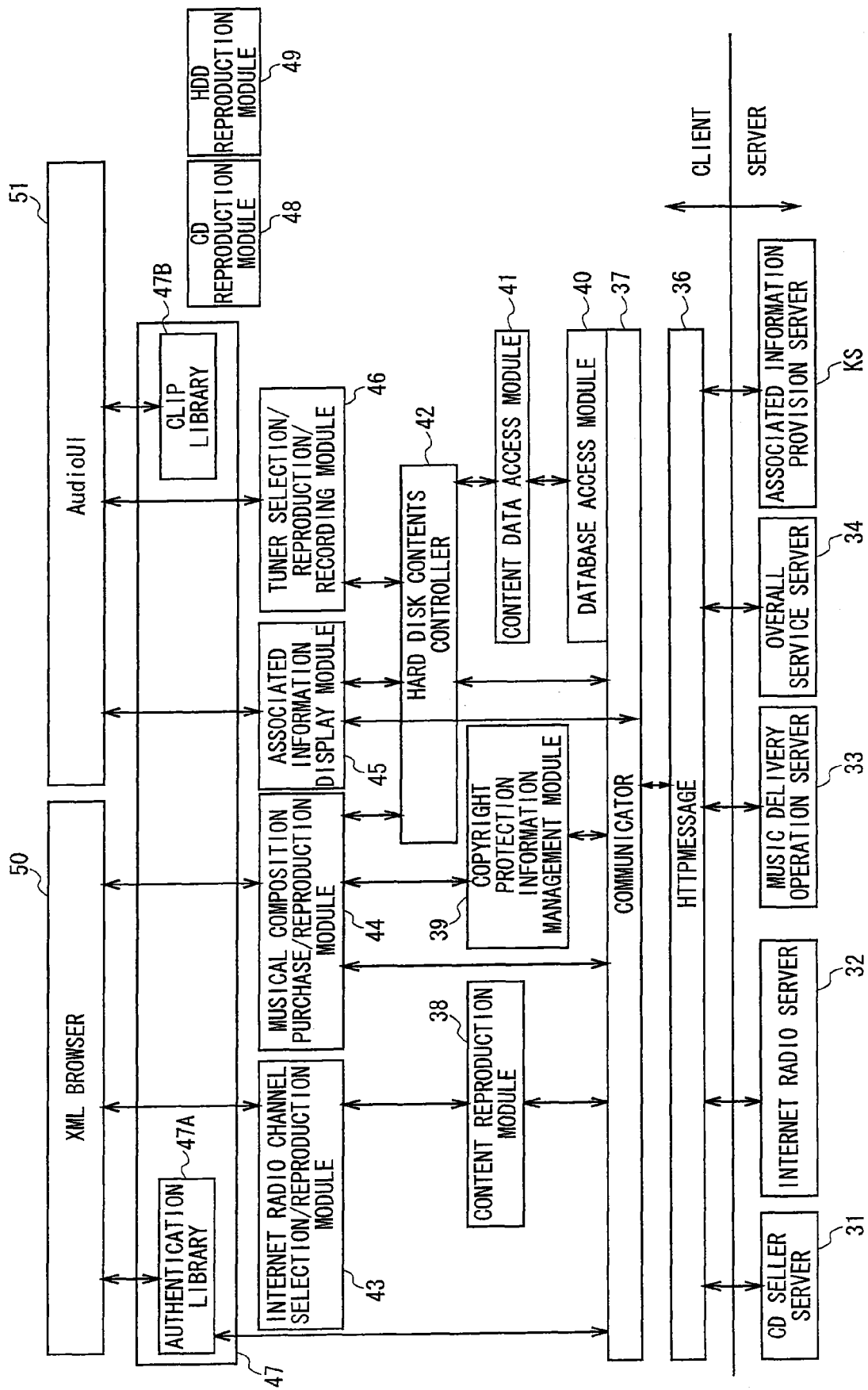
FIG. 7 is a schematic diagram showing program modules of the client terminal.

As shown in FIG. 7, the client terminal CT comprises program modules operating under the OS. Specifically, the client terminal CT interacts with various servers such as a CD seller server 31 to sell CDs, an Internet radio server 32, a music delivery operation server 33, an overall service server 34, and the associated information provision server KS.

An HTTP (Hyper Text Transfer Protocol) message program uses HTTP communication to interact with various servers such as the CD seller server 31, the overall service server 34 to provide overall services, and the associated information provision server KS. A communicator program 37 is a communication module to communicate with the overall service server 34 and the like.

Above the communicator program 37, there are a content reproduction module 38 and a copyright protection information management module 39. The content reproduction module 38 interprets codec information of contents and reproduces the contents. The copyright protection information management module 39 handles information about copyright protection. The content reproduction module 38 and the copyright protection information management module 39 correspond to an Internet radio channel selection/reproduction module 43 and a musical composition purchase/reproduction module 44, respectively. The Internet radio channel selection/reproduction module 43 selects and reproduces Internet radio channels. The musical composition purchase/reproduction module 44 controls purchase of musical compositions and reproduces samples.

An XML (eXtensible Markup Language) browser 50 is positioned above the Internet radio channel selection/reproduction module 43 and the musical composition purchase/reproduction module 44. The XML browser 50 interprets XML files from various servers and displays them on the display 17.

For example, a user selects a musical composition using the XML browser 50. The selected musical composition is purchased through the musical composition purchase/reproduction module 44 and is written to the hard disk drive 21 via a hard disk contents controller 42.

The communicator program 37 connects with an authentication library 47A of a library 47. The authentication library 47A authenticates various servers such as the overall service server 34.

Above the communicator program 37, there are a database access module 40, a content data access module 41, and a hard disk contents controller 42.

The database access module 40 accesses various databases configured in the hard disk drive 21. The content data access module 41 accesses contents stored in the hard disk drive 21. The hard disk contents controller 42 manages contents stored in the hard disk drive 21.

Above the hard disk contents controller 42, there are an associated information display module 45 and a tuner selection/reproduction/recording module 46. The associated information display module 45 displays titles and artist names of musical compositions broadcast by the radio station RS. The tuner selection/reproduction/recording module 46 selects a radio station RS and records musical composition contents received from the radio station RS on the hard disk drive 21.

For example, when a musical composition is received from the radio station RS selected via an audio user interface 51, the received musical composition is written to the hard disk drive 21 via the content data access module 41.

The associated information display module 45 receives associated information from the associated information provision server KS via the HTTP message program 36. The associated information includes titles and artist names of the musical compositions currently broadcast by the radio station RS corresponding to the tuner selection/reproduction/recording module 46. The associated information is displayed on the display 17 via the audio user interface (UI) 51.

The associated information which can be displayed on the display 17 via the audio user interface 51 can also be temporarily stored in a clip library 47B of the library 47. According to a user instruction, the associated information is finally stored in the hard disk drive 21 via the database access module 40.

The other program modules for the client terminal CT include a CD reproduction module 48 and an HDD reproduction module 49. The CD reproduction module 48 reproduces CDs. The HDD reproduction module 49 reproduces the hard disk drive 21. A reproduction result is output via the audio data processing section 24 and the speaker 25.

(1-2) Clipping Process Sequence of Associated Information

Clipping sequences of associated information will be described. One is the sequence when the client terminal CT acquires associated information containing musical composition information about musical compositions broadcast in a program by a radio station RS from the associated information provision server KS, and performs clipping of the associated information. Another is the sequence when the client terminal CT acquires associated information containing musical composition information about a specified CD out of data in a CD title information provision database 96 previously stored in the associated information provision server KS, and performs clipping of associated information.

Figure 8:
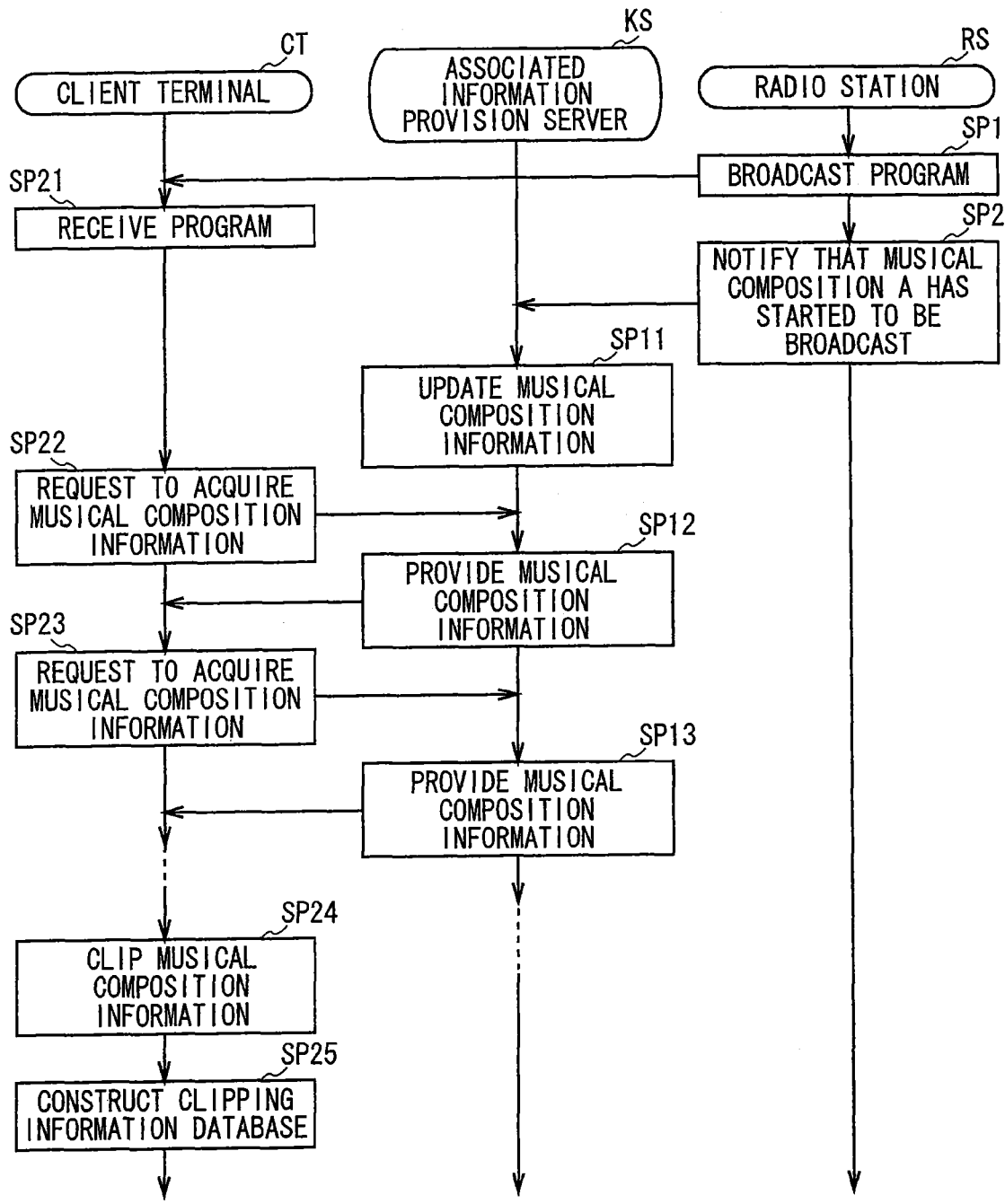
FIG. 8 is a schematic diagram showing a clipping sequence of musical composition information associated with musical compositions in a radio program.

(1-2-1) Clipping Sequence of Musical Composition Information about Musical Compositions in Program The clipping process will be described with reference to FIG. 8. The process is when the client terminal CT performs the clipping of the associated information containing musical composition information about musical compositions broadcast by the radio station RS in a program.

At step SP1, the radio station RS starts broadcasting a program scheduled for the time. The radio station RS proceeds to the next step SP2. At step SP2, after starting broadcasting a musical composition A in the program, the radio station RS notifies the associated information provision server KS that the musical composition A has started being broadcast.

At step SP11, the associated information provision server KS uses the musical composition information database 93 (FIG. 3), to maintain musical composition information associated with a plurality of types of musical compositions. More specifically, the musical composition information includes titles and artist names concerning a plurality of types of musical compositions, names and numbers of CDs that record the corresponding musical compositions, and the like. It is necessary to provide the client terminal CT with musical composition information associated with musical composition A notified from the radio station RS. For this purpose, the associated information provision server KS updates the previous musical composition information to musical composition information associated with musical composition A, and then proceeds to the next step SP12.

By the way, at step SP21, the client terminal CT receives and listens to the program broadcast by the radio station RS at step SP1, so that also the musical composition A broadcast in that program can be received and the user can listen to it. And then, the client terminal CT proceeds to the next step SP22.

At step SP22, the client terminal CT performs polling by transmitting an acquisition request for the musical composition information to the associated information provision server KS at an interval of 30 seconds. The musical composition information includes titles and artist names associated with musical composition A. The client terminal CT then proceeds to the next step SP23.

At step SP12, in response to the acquisition request from the client terminal CT, the associated information provision server KS provides the musical composition information about musical composition A currently storing to provide to the client terminal CT, via the network 2, and then proceeds to the next step SP13.

The client terminal CT displays the associated information containing the musical information about the musical composition A provided from the associated information provision server KS on the display 17. Thereby, the user can know the associated information containing the musical component information such as the titles and the artist names of musical component A broadcast in the program.

The musical composition information according to the present invention includes not only titles and artist names but also CD numbers, broadcasting station identification information used to specify the radio station RS being supplier that broadcast the musical composition A, media identification information used to specify recording media that record the musical composition.

At step SP23, when 30 minutes passed from the last acquisition request, the client terminal CT transmits again the acquisition request for musical composition information to the associated information provision server KS.

At this time, at step SP13, the associated information provision server KS provides again musical composition information about musical composition A to the client terminal CT via the network 2.

The client terminal CT acquires musical composition information about musical composition A up to the musical composition information about musical composition A currently stored to be provided by the associated information provision server KS is updated to musical composition information about musical composition that will be broadcast next. The musical composition information about musical composition A is displayed on the display 17 as the associated information until updated. A method for providing musical composition information by the associated information provision server KS will be described later as a second embodiment.

At step SP24, the client terminal CT performs clipping of the musical composition information about musical composition A provided from the associated information provision server KS as the associated information in the hard disk drive 21, and then proceeds to the next step SP25.

At step SP25, the client terminal CT acquires musical composition information about musical composition B, musical composition C . . . following the musical composition information about musical composition A from the associated information provision server KS, and also performs clipping of it in the hard disk drive 21. In this manner, a clipping information database related to associated information about musical compositions is created.

Figure 9:
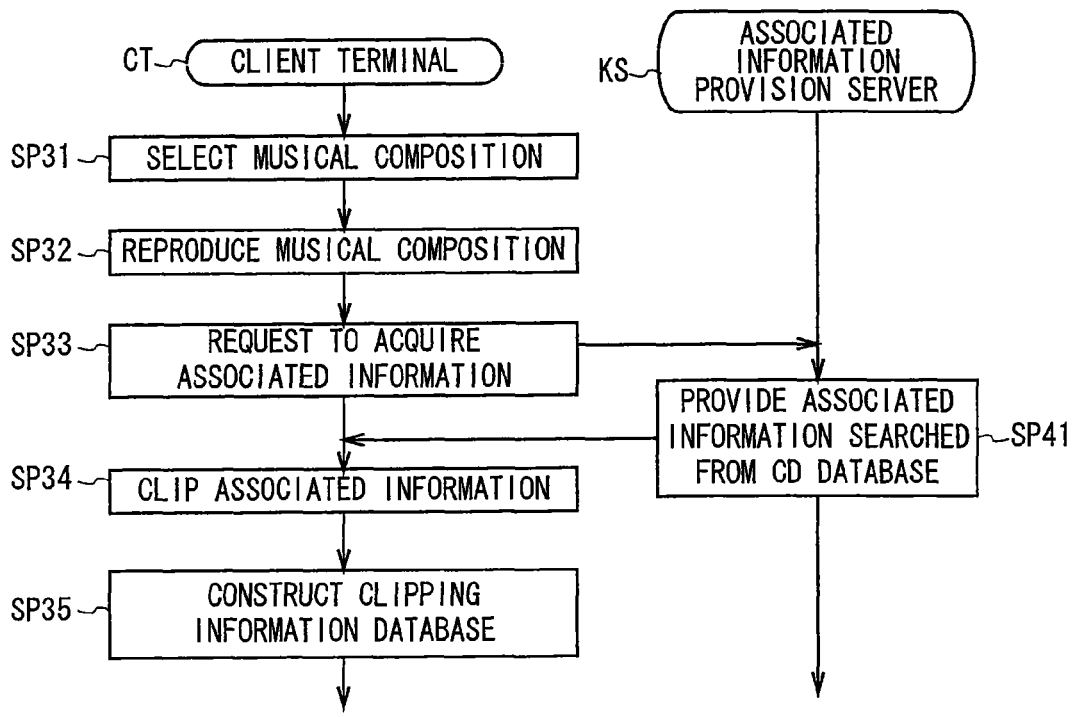
FIG. 9 is a schematic diagram showing a clipping sequence of musical composition information associated with musical compositions in a CD.

(1-2-2) Clipping Sequence of Musical Composition Information Related to Musical compositions in CD Clipping process will be described with reference to FIG. 9. The client terminal CT performs clipping of associated information containing musical composition information about a specified CD from among information in the CD title information provision database 96 previously stored in the associated information provision server KS.

At step SP31, the client terminal CT selects a CD recording a musical composition to be reproduced by the media drive 19 on a select screen (not shown) on the display 17. The client terminal CT then proceeds to the next step SP32.

At step SP32, the client terminal CT reproduces a CD including the music composition selected on the select screen by the media drive 19.

At step SP33, the client terminal CT requests the associated information provision server KS to acquire associated information concerning the CD reproduced by the media drive 19. Then the client terminal CT proceeds to the next step SP34.

At this time, at step SP41, the associated information provision server KS retrieves the associated information about the CD in response to the acquisition request from the client terminal CT by the CD title information provision database 96 previously stored, and provides the retrieval result to the above client terminal CT.

The associated information retrieved by the CD title information provision database 96 includes not only the title and the artist name but also the CD number and media identification information that represents to be the above CD. Note that, there are various other media identification information such as CD (Compact Disc), DVD (Digital Versatile Disc), and Memory Stick (registered trademark).

At step SP34, the client terminal CT acquires the associated information about the CD from the associated information provision server KS, and performs clipping in the hard disk drive 21. The client terminal CT then proceeds to the next step SP35.

At step SP35, every time when a CD is selected on the select screen, the client terminal CT acquires associated information about the CD from the associated information provision server KS and performs clipping in the hard disk drive 21. Thus the clipping information database composed of associated information about plural CDs is created.

(1-2-3) Data Configuration of Clipping Information Database

Figure 10:
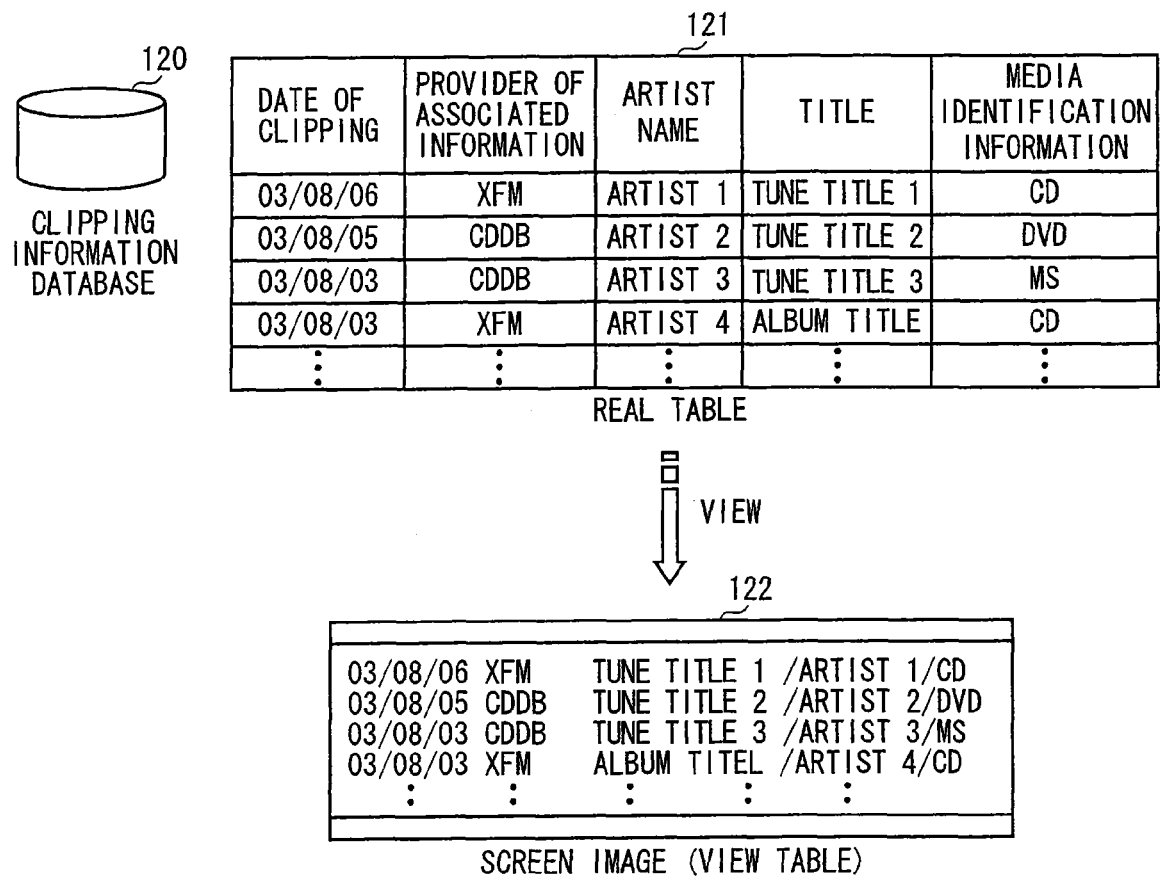
FIG. 10 is a schematic diagram showing the data configuration of a clipping information database.

As shown in FIG. 10, in a clipping information database 120, a table 121 (true table) being the contents of the musical composition information is stored. The table 121 includes columns such as clipping date, supplier of associated information, artist name, title, and media identification information.

In the table 121 (true table), for example, the clipping date is registered as the date. The supplier of the associated information is registered as broadcasting station identification information that specifies a radio station and a CD title information provision database. The artist name is registered as artist 1, artist 2 . . . . The title is registered as a tune title and album title. And the media identification information is registered as a media name such as CD, DVD or MS (Memory Stick) (registered trademark).

Note that, when the field of media name is blank, it represents that the musical composition information is about a musical composition that has not been recorded in any media and is not released yet.

The table 121 (true table) stored in the clipping information database 120 is displayed as a view table 121 on the display 17 by the CPU 11.

Here, the music composition information registered in the table 121 for example "Mar. 8, 2006; TFM; artist 1; tune title 1; CD" represents that on Aug. 6, 2003, the musical composition having the tune title 1 by the artist 1 was broadcast from the radio station RS (TFM), and the musical composition is recorded in CD.

For example, the musical composition information "Mar. 8, 2005; CDDB; artist 2; tune title 2; DVD" represents that on Aug. 5, 2003, the musical composition information about the tune title 2 by the artist 2 was retrieved by a CD DB (database) in the associated information provision server KS and provided, and the musical composition is recorded in DVD.

Note that, the clipping information database 120 also can manage the musical composition information in a directory in the table 121.

Figure 11:
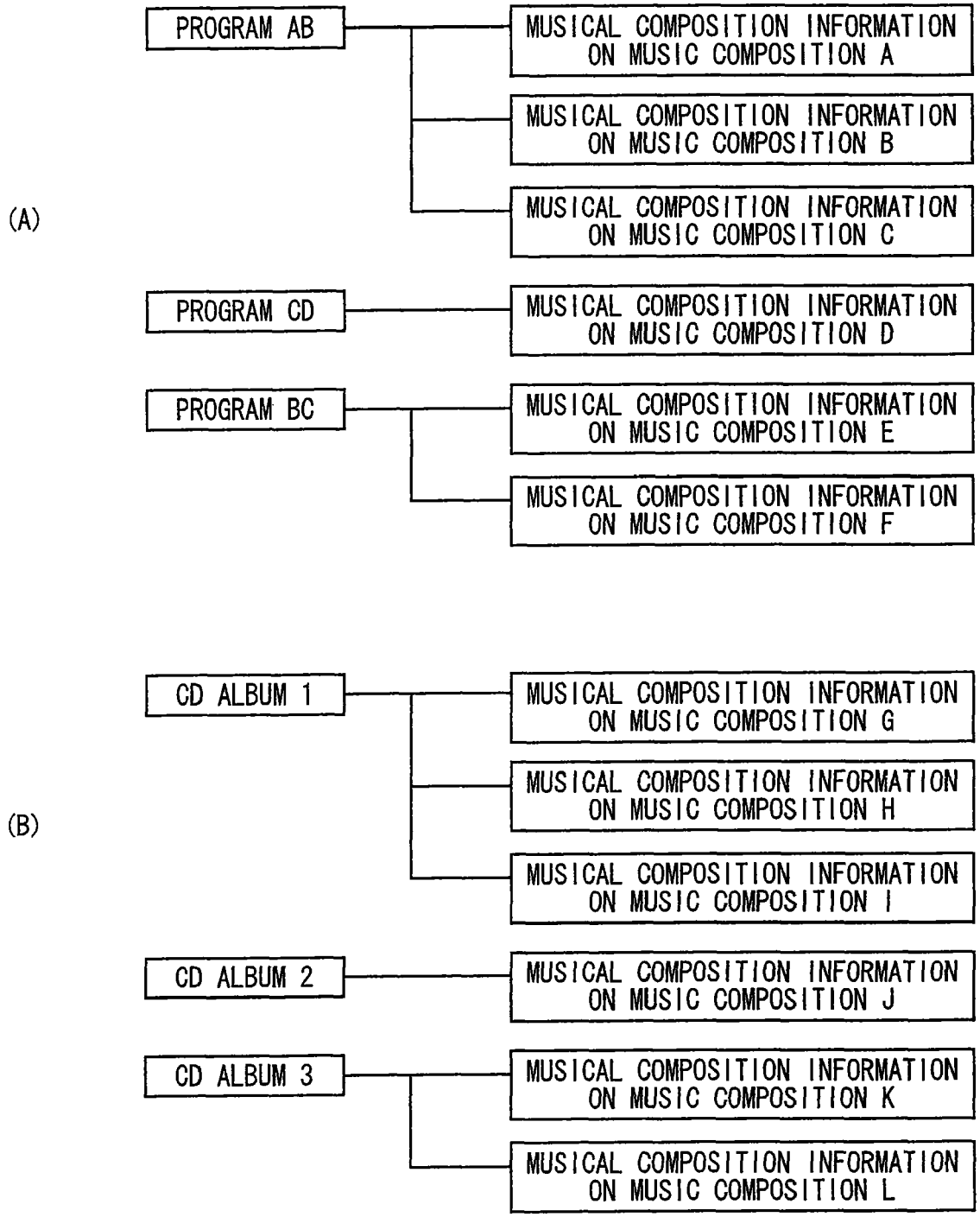
FIG. 11 is a schematic diagram for explaining the directory of the musical composition information.

For example, as shown in FIG. 11(A), musical composition information about musical composition A, musical composition information about musical composition B, and musical composition information about musical composition C includes "a program title" of the radio program respectively. When there is the keyword of a common program title "program ab" in each musical composition information, the clipping information database can manage the musical composition information about the musical composition A, the musical composition information about the musical composition B, and the musical composition information about the musical composition C in a directory under the keyword "program ab".

Similarly, the musical composition information about musical composition D can be managed in a directory under the keyword of a program title "program cd". Musical composition information about musical composition E and musical composition information about musical composition F can be managed in a hierarchical directory under the keyword of a program title "program bc".

Further, as shown in FIG. 11(B), musical composition information about musical composition G, musical composition information about musical composition H, and musical composition information about musical composition I respectively includes the "album title" of the CD album. When there is the keyword of a common CD album "CD album 1" in each musical composition information, the musical composition information about the musical composition G, the musical composition information about the musical composition H, and the musical composition information about the musical composition I can be managed in a directory under the keyword "CD album 1".

Similarly, musical composition information about musical composition J can be managed in a directory under the keyword of a CD album "CD album 2". Musical composition information about musical composition K and musical composition information about musical composition L can be managed in a directory under the keyword of a CD album "CD album 3".

Therefore, the CPU 11 of the client terminal CT also can display the musical composition information in the clipping information database 120 in state of directory on the display 17. Thus, the user can easily find desired musical composition information from among numbers of musical composition information.

Figure 12:
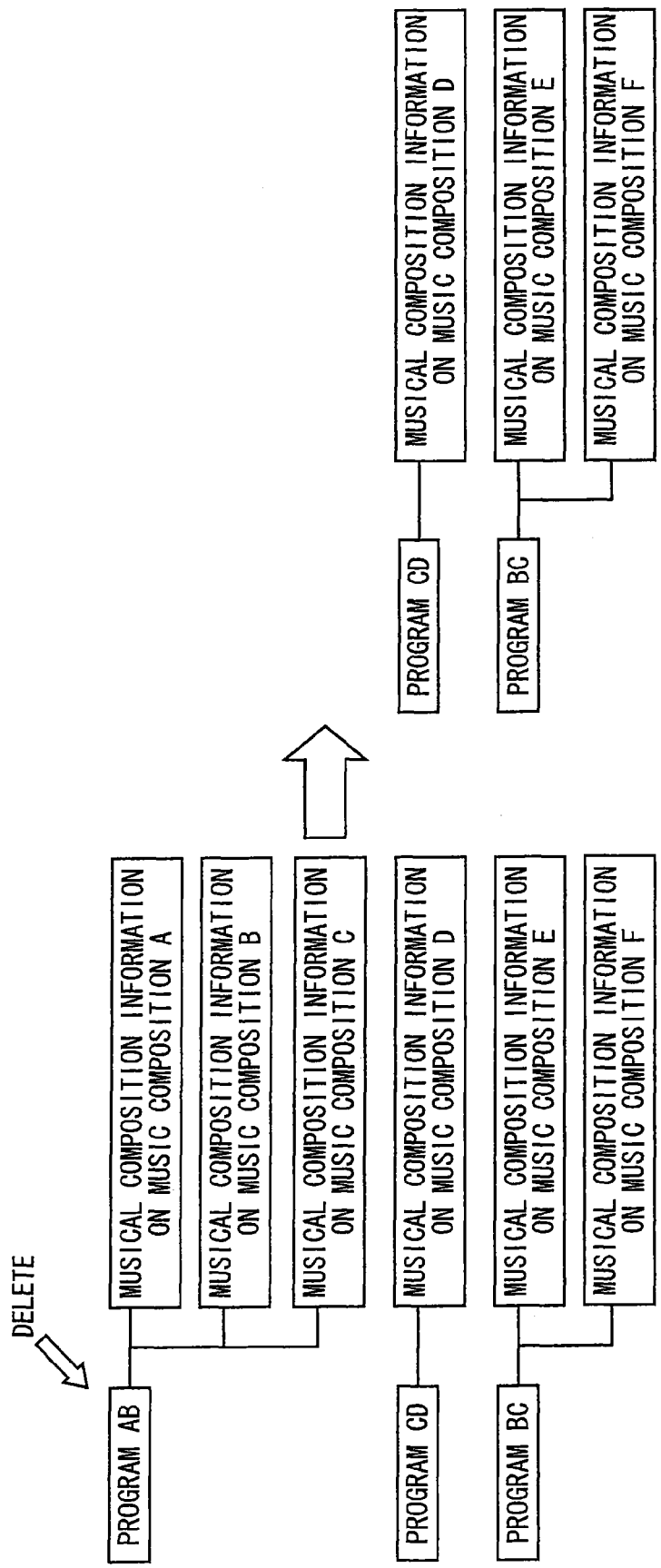
FIG. 12 is a schematic diagram for explaining chaining deletion.

Further, the clipping information database 120 can manage the musical composition information under a common keyword in a directory. As shown in FIG. 12, in response to a command to delete an upper directory, such as a "program ab" directory, the CPU 11 of the client terminal CT can delete the musical composition information about musical composition A, the musical composition information about musical composition B, and the musical composition information about musical composition C included in the "program ab" at once.

(1-3) Retrieval Sequence Using Associated Information

Figure 13:
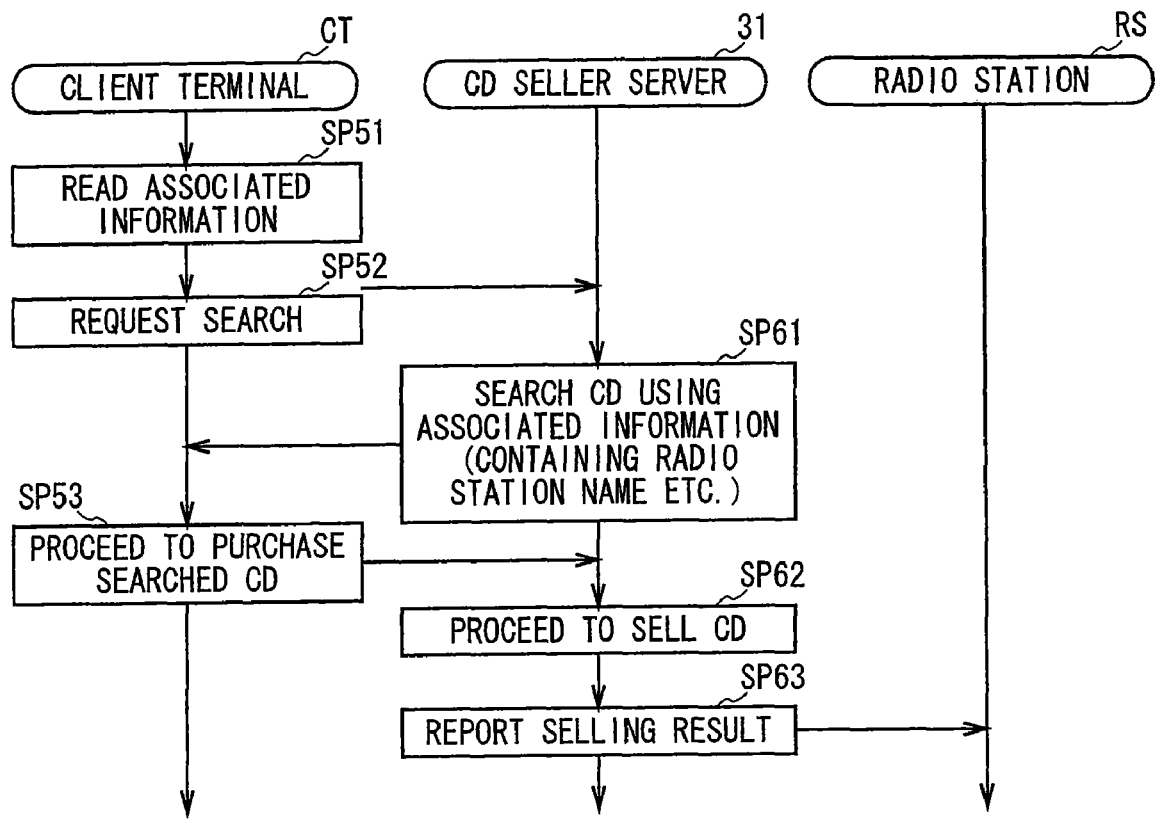
FIG. 13 is a schematic diagram showing a retrieval sequence using associated information.

A retrieval sequence will be described with reference to FIG. 13. The client terminal CT performs a retrieval sequence to a CD seller server 31 using associated information, according to a specified communication program.

At step SP51, the client terminal CT reads out specified musical composition information as associated information from the clipping information database 120 stored in the hard disk drive 21, and proceeds to the next step SP52. For instance, the desired musical composition information can be assumed to be user-specified musical composition information selected by user operations to the client terminal CT.

At step SP52, the client terminal CT transmits a part of the associated information read out from the clipping information database 120 as a retrieval key to the CD seller server 31 to make a search request. The client terminal CT then proceeds to the next step SP53.

The client terminal CT sends the retrieval key to the CD seller server 31. The retrieval key corresponds to the part of the associated information. For example, the information is about an artist name, a radio station name or CD DB 96 that is the supplier of the associated information as broadcasting station identification information, and a media name as media identification information.

At step SP61, the CD seller server 31 retrieves plural kinds of CDs having some relationship with the retrieval key, based on the artist name, the supplier of the associated information, and the media identification information sent from the client terminal CT. The CD seller server 31 transmits retrieval results to the client terminal CT, and then proceeds to the next step SP62.

Here, the CD seller server 31 retrieves all of the CDs released by the artist sold in the past, based on the artist name. When a radio station name (a radio station RS) is included in the retrieval keys as the supplier of the associated information, the CD seller server 31 retrieves all of the CDs recording the music composition that was broadcast in programs by the above radio station RS on that day. The CD seller server 31 transmits the retrieval results based on both of the artist name and the radio station name to the client terminal CT.

Note that, when a radio station name (radio station RS) is included in the retrieval key as the supplier of the associated information, the CD seller server 31 can recognize that the client terminal CT acquired the associated information from the home page of the radio station.

Further, when a CD title information provision database is included in the retrieval key as the supplier of the associated information, the CD seller server 31 can recognize that the client terminal CT acquired the associated information from the CD title information provision database 96.

At step SP53, the client terminal CT selects the CD number of a desired CD from among the retrieval results from the CD seller server 31, and performs a purchase procedure to the CD seller server 31 based on the CD number.

The retrieval results from the CD seller server 31 are various retrieval results. The results include not only a retrieval result based on the artist name but also all of the CDs recording the music composition that was broadcast in the program on that day by the radio station RS. If the user chooses from among the various retrieval results, the possibility that the user can find a desired CD becomes remarkably high.

Furthermore, the user of the client terminal CT can recognize also whether the recording media recording that musical composition is a CD, DVD or Memory Stick (registered trademark), or if the musical composition has not been released, by the media identification information in the retrieval result. Therefore, the user can easily decide whether or not to perform the subsequent purchase procedure.

At step SP62, if the CD seller server 31 receives the CD number to which the purchase procedure was performed from the client terminal CT, the CD seller server 31 executes a selling procedure to deliver the CD corresponding to the CD number to the user's house as well as a credit settlement process by the account database 114. The CD seller server 31 then proceeds to the next step SP63.

In the case where the supplier of the associated information was recognized to be "radio station RS" at step SP61, it can be determined that the CD could be sold because the user of the client terminal CT listened to the musical composition broadcast in the program by the radio station RS.

At step SP63, the CD seller server 31 reports that sold result to the radio station RS.

Thereby, the radio station RS can tally up it as market information that the broadcast in the program led up to the sale of the CD of the musical composition. Also it becomes possible to create a business model with the CD seller server 31 such as receiving a few percent of profits by the CD sales as a margin from the CD seller server 31.

In this manner, as a part of the associated information, the CD seller server 31 uses not only an artist name but also a radio station name and the CD title information provision database 96 for representing the supplier of the associated information, and a media name for representing media identification information. They are transmitted to the CD seller server 31 as retrieval keys. Thereby, the CD seller server 31 can provide retrieval results of CDs having variety based on the artist name and the radio station name to the client terminal CT. Also, the broadcasting station identification information representing the supplier of the associated information, and the media identification information can be utilized for various uses.

(1-4) Operation and Effects

According to the above configuration, the client terminal CT of the information provision system 1 performs clipping of musical composition information about a musical compositions broadcast in a program from an associated information provision server KS via the homepage of a radio station RS in the hard disk drive 21. Thus the client terminal CT creates the clipping information database 120.

Furthermore, the client terminal CT performs clipping of associated information about CDs retrieved by the CD DB 96 stored in a musical composition information database 93 in the associated information provision server KS in the hard disk drive 21. Thus the client terminal CT creates the clipping information database 120.

Thereafter, the client terminal CT reads the associated information from the clipping information database 120, and transmits a part of the associated information as retrieval keys to the CD seller server 31, such as artist name, the supplier of the associated information, and media identification information. The CD seller server 31 retrieves CDs having some relationship to the retrieval keys. The client terminal CT can acquire retrieval results from the CD seller server 31.

The retrieval results obtained at this time have variety. The retrieval results include not only CDs directly having relationship to one of the retrieval keys the artist name but also CDs having some relationship to the supplier (radio station name) of the associated information obtained from the associated information provision server KS by performing clipping via the home page of the radio station RS.

Therefore, retrieval results by the present invention is broader than the retrieval result only under a retrieval key that has direct relationship to CDs such as artist name and title. There is remarkably higher possibility to find a CD desired by the user.

Furthermore, the supplier (radio station name) of the associated information obtained by clipping from the associated information provision server KS via the home page of the radio station RS is included as a part of the retrieval keys. Therefore, based on the retrieval results, that the user of the client terminal CT purchased a CD by listening to the musical composition broadcast in a program by the radio station RS can be easily distinguished. The CD seller server 31 also can effectively use the variety of the associated information to create a business model such as paying the radio station RS a margin.

According to the above configuration, a part of the associated information obtained by clipping from the associated information provision server KS is used for retrieval keys. The associated information includes not only artist name but also radio station name that broadcast the musical composition in a program as the supplier of the associated information. The CD seller server 31 retrieves CDs under the retrieval keys. The client terminal CT of the information provision system 1 acquires the retrieval results of the CDs. Thus the client terminal CT can provide retrieval results having variety that there has higher possibility to find a desired CD to the user, not limited retrieval result that the user can image in some degree.

Note that, in this embodiment, it has dealt with the case where when the client terminal CT is receiving musical composition A presently being broadcast from the radio station RS, the client terminal CT requests to the associated information provision server for acquiring musical composition information including the artist name, the title, and the like, as the associated information about the musical composition A. However, the present invention is not only limited to this but also the client terminal CT may request to the associated information provision server for acquiring musical composition information including musical composition identification information (contents identification information) used to identify the musical composition A, as the associated information about the musical composition A.

In this case, at the aforementioned step SP52, the client terminal CT transmits the musical composition identification information in the associated information as a retrieval key to the CD seller server 31. The CD seller server 31 searches for plural kinds of CDs having some relationship to the retrieval key of the musical composition identification information from the client terminal CT, and transmits retrieval results to the client terminal CT.

(2) Second Embodiment

A method for providing musical composition information by an associated information provision server KS will be described in detail as a second embodiment. First, a music related service provision system 1000 which corresponds to the information provision system 1 of the first embodiment will be described. This music related service provision system 1000 is composed of a portal server 1003 and various service servers 1004-1007, and is a system capable of single sign-on. The associated information provision server KS of the first embodiment corresponds to a radio broadcast information delivery server 1006, for example. The CD seller server 31 corresponds to a trade server 1005, for example. And the client terminal CT corresponds to a client terminal 1002.

(2-1) System Configuration

Figure 14:
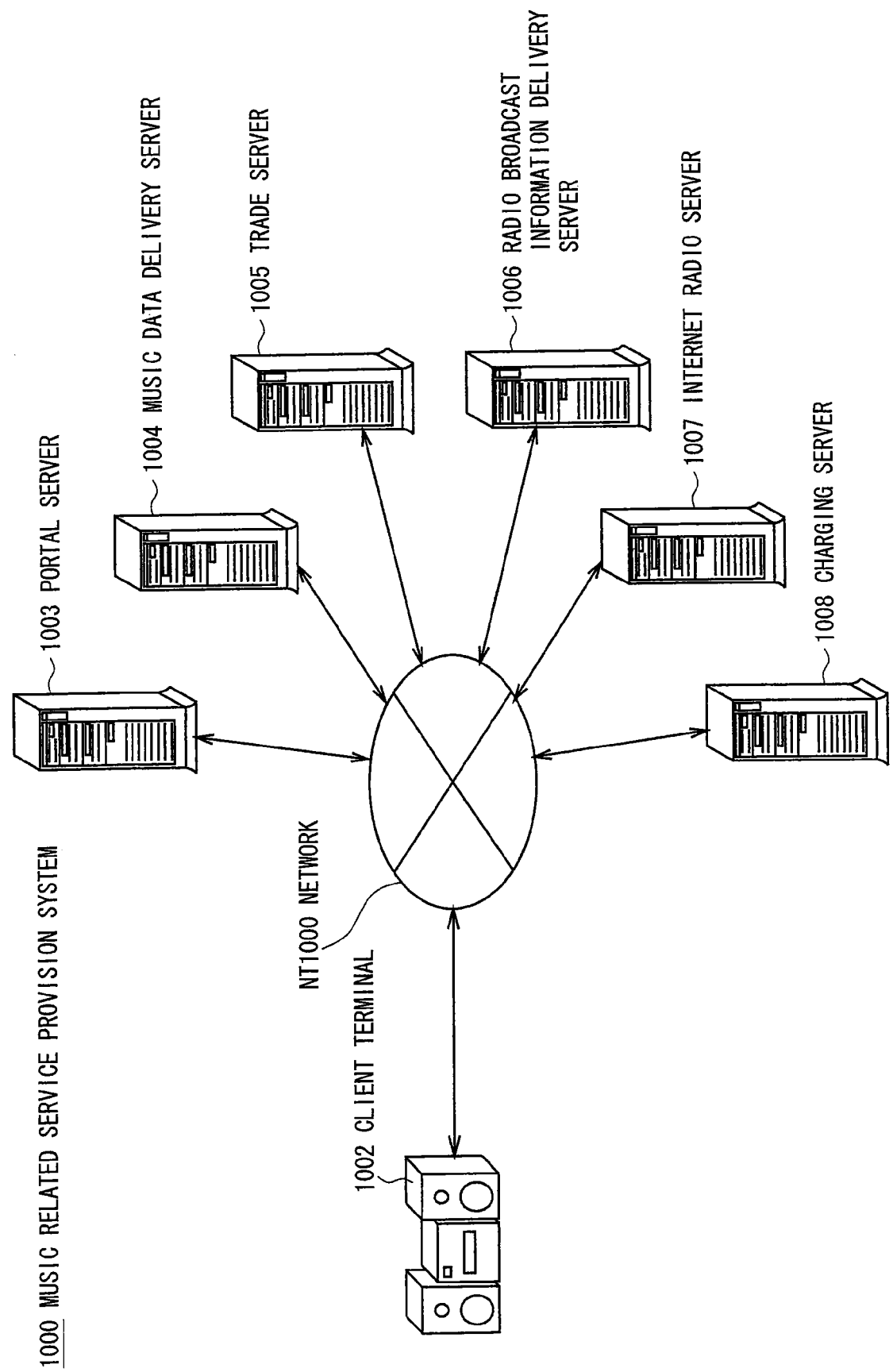
FIG. 14 is a schematic diagram showing the overall configuration of a music related service provision system according to the present embodiment.

Referring to FIG. 14, the reference numeral 1000 denotes a music related service provision system as a whole. The system 1000 comprises a client terminal 1002 and a plurality of service servers. The client terminal 1002 belongs to a user who makes a contract with a service provider of the music related service provision system 1000. The service servers include: a portal server 1003 to manage the client terminal 1002; and the other servers 1004 through 1008 to provide the client terminal 1002 with various services related to the music.

According to this embodiment, the music data delivery server 1004 provides music data delivery services to deliver music data as content data to the client terminal 1002. The content data complies with such formats as ATRAC3 (Adaptive Transform Acoustic Coding 3), AAC (Advanced Audio Coding), WMA (Windows Media Audio), RealAUDIO G2 Music Codec, and MP3 (MPEG Audio Layer-3).

A trade server 1005 provides trade services to sell CD (Compact Disc), DVD (Digital Versatile Disc), and the like to the user via the client terminal 1002.

Further, the radio broadcast information delivery server 1006 provides radio broadcast information delivery services to deliver radio broadcast information to the client terminal 1002. Specifically, the radio broadcast information includes radio programs, music, and the like broadcasted from a radio station.

The Internet radio server 1007 provides Internet radio broadcast services to broadcast radio broadcast data to the client terminal 1002 via the network NT1000 equivalent to the Internet. The radio broadcast data is delivered in streaming format.

In addition, a charging server 1008 performs a charging process to charge users for various fees in response to requests from the portal server 1003 and the like.

(2-2) Configuration of Client Terminal 1002

(2-2-1) Functional Circuit Block Configuration of Client Terminal 1002

Figure 15:
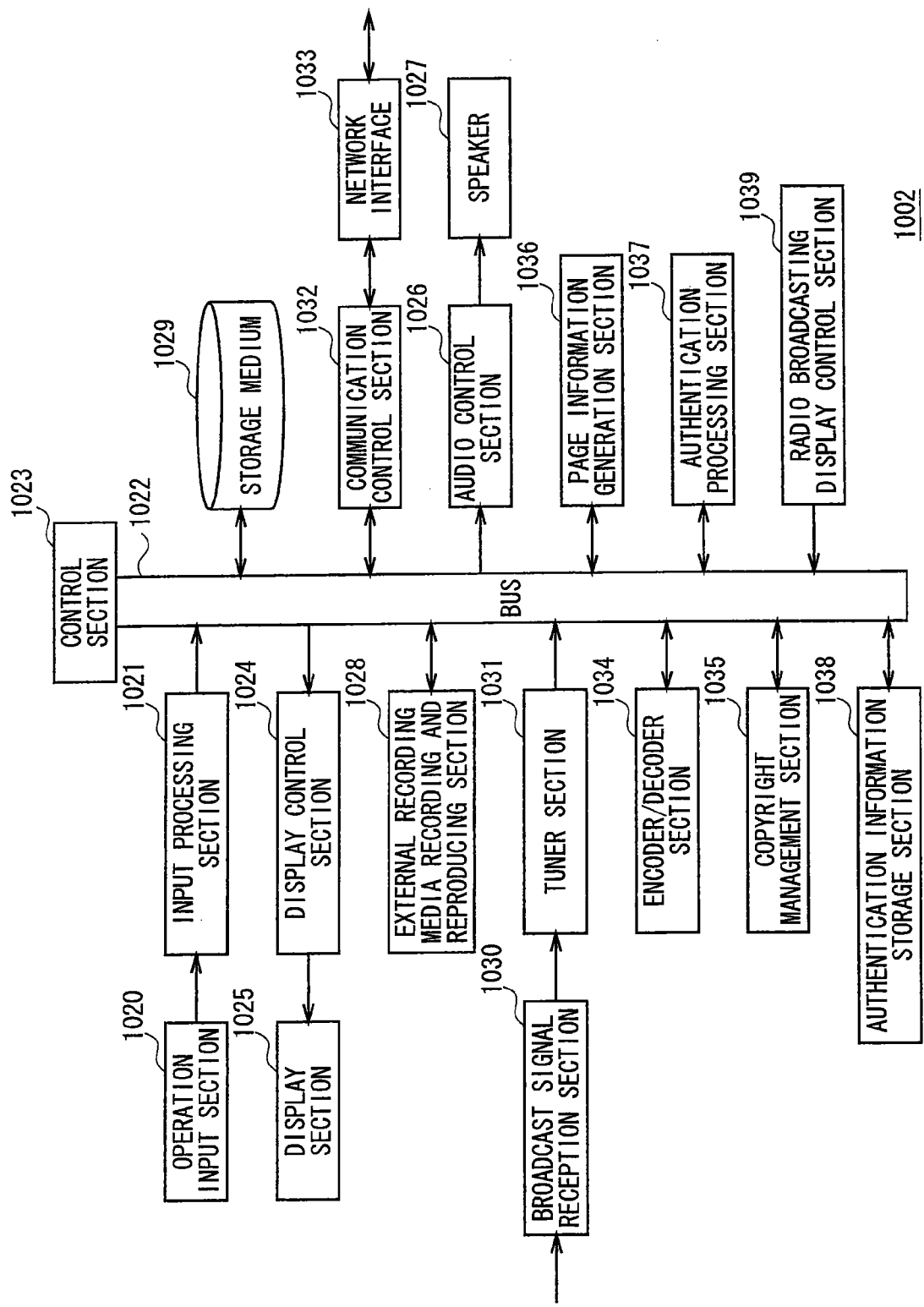
FIG. 15 is a block diagram showing the hardware configuration of a client terminal using functional circuit blocks.

The following describes the hardware configuration of the client terminal 1002 using functional circuit blocks. As shown in FIG. 15, the client terminal 1002 has an operation input section 1020 comprising various operation buttons provided on the surface of the client terminal cabinet or a remote controller (not shown). When a user operates the operation input section 1020, it detects the user operation and sends an input operation signal corresponding to the operation to an input processing section 1021.

The input processing section 1021 is supplied with the input operation signal from the operation input section 1020, converts the signal into a specific operation command, and sends it to a control section 1023 via a bus 1022.

The control section 1023 is supplied with operation commands and control signals from circuits connected to the bus 1022. Based on these operation commands and control signals, the control section 1023 controls operations of these circuits.

A display control section 1024 is supplied with video data via the bus 1022 and applies digital-analog conversion to the video data to generate an analog video signal. The display control section 1024 sends the resulting analog video signal to a display section 1025.

The display section 1025 represents a display device such as a liquid crystal display and may be directly attached to the surface of the main unit cabinet or may be externally connected.

The display section 1025 is supplied with processing results from the control section 1023 and various video data as an analog video signal via the display control section 1024. The display section 1025 displays a video based on the analog video signal.

An audio control section 1026 applies digital-analog conversion to audio data supplied via the bus 1022 and sends a resulting analog audio signal to a speaker 1027. The speaker 1027 outputs audio based on the analog audio signal supplied from the audio control section 1026.

An external recording media recording and reproducing section 1028 reads and reproduces content data from external recording media such as CDs and Memory Stick (registered trademark), and records targeted content data on the external recording media. Memory Stick comprises flash memory enclosed in a packaging case.

The external recording media recording and reproducing section 1028 reads video data as content data from an external recording medium and supplies the read video data to the display control section 1024 via the bus 1022.

The display control section 1024 is supplied with the video data read as content data from the external recording medium by the external recording media recording and reproducing section 1028. The display control section 1024 then converts the video data into an analog video signal and sends it to the display section 1025.

The external recording media recording and reproducing section 1028 reads audio data as content data from the external recording medium and supplies the read audio data to the audio control section 1026 via the bus 1022.

When the external recording media recording and reproducing section 1028 reads audio data as content data from the external recording medium, the audio control section 1026 converts the audio data into an analog audio signal and supplies it to the speaker 1027.

When the external recording media recording and reproducing section 1028 reads the content data from the external recording medium, the control section 1023 sends that content data to a storage medium 1029 in the client terminal 1002 via the bus 1022. The control section 1023 can store the content data in the storage medium 1029. Storing content data in the storage medium 1029 is also referred to as ripping.

When reading video data such as image data as content data from the storage medium 1029, the control section 1023 supplies the read video data to the display control section 1024 via the bus 1022.

When reading audio data as content data from the storage medium 1029, the control section 1023 supplies the read audio data to the audio control section 1026 via the bus 1022.

In addition, the control section 1023 can read music data from the storage medium 1029 and transfers it to the external recording media recording and reproducing section which can then record the music data on the external recording medium.

A broadcast signal reception section 1030 receives radio broadcasting waves transmitted from radio stations and supplies them to the tuner section 1031.

As mentioned above, the broadcast signal reception section 1030 receives radio broadcasting waves. Under the control of the control section 1023, the tuner section 1031 extracts such radio broadcasting signals from the received radio broadcasting waves as to have a broadcasting frequency corresponding to the radio station specified from the operation input section 1020, for example. The tuner section then applies specified reception processing to the extracted signals. The tuner section 1031 sends resulting audio data to the audio control section 1026 via the bus 1022.

The audio control section 1026 converts the audio data supplied from the tuner section 1031 into an analog audio signal and sends this signal to the speaker 1027. The speaker outputs the audio of the radio program broadcast from the radio station. In this manner, the user can listen to the radio program's audio.

The control section 1023 can record audio of radio programs. To do this, the control section 1023 sends audio data acquired by the tuner section 1031 to the storage medium for storage.

Further, the control section 1023 can connect to a network NT1000 via a communication control section 1032 and a network interface 1033 in order. Consequently, the control section 1023 can access the portal server 1003, and the other servers 1004 through 1007 on the network NT1000. In this manner, the client terminal can interchange various information and data with the portal server 1003, and the other servers 1004 through 1007, and the like.

Compressed and encoded content data is received from the network NT1000 via the network interface 1033 and the communication control section 1032 in order. Alternatively, compressed and encoded content data is read from the storage medium 1029 and external recording media. An encoder/decoder section 1034 decodes such content data and sends it to the display control section 1024 or the audio control section 1026.

Further, the encoder/decoder section 1034 compresses and encodes neither compressed nor encoded content data read from external recording media or audio data supplied from the tuner section 1031. The encoder/decoder section 1034 sends the compressed and encoded content data to the storage medium 1029.

Under the control of the control section 1023, content data is compressed and encoded in the encoder/decoder section 1034 and is stored in the storage medium 1029.

A copyright management section 1035 generates copyright management information corresponding to content data that is downloaded from the network NT1000 via the network interface 1033 and the communication control section 1032 in order or is read from external recording media by the external recording media recording and reproducing section 1028.

Under the control of the control section 1023, the copyright management information generated in the copyright management section 1035 is associated with the content data and is registered to the recording medium 1029.

The copyright management section 1035 is used to check out content data associated with the copyright management information from the storage medium 1029 to a specific external recording medium and to check in the content data associated with the copyright management information from the specific external recording medium to the storage medium 1029. The copyright management section 1035 appropriately updates contents of the copyright management information corresponding to the content data to protect the copyright of the content data.

The client terminal receives XML (eXtensible Markup Language) or HTML (Hyper Text Markup Language) files from the network NT1000 via the network interface 1033 and the communication control section 1032 in order. A page information generation section 1036 interprets page information of these files and generates video data to be displayed on the display section 1025. The page information generation section 1036 then sends the generated video data to the display control section 1024.

An authentication processing section 1037 performs authentication processes such as sending authentication information to the portal server 1003 and the other servers 1004 through 1007 on the network NT1000 connected via the network interface 1033, via the communication control section 1032 and the network interface 1033 in order.

An authentication information storage section 1038 stores authentication information needed for the authentication processing section 1037 to access the portal server 1003, the other servers 1004 through 1007, and the like.

A radio broadcasting display control section 1039 sends a request signal to the radio broadcast information delivery server 1006 via the communication control section 1032 and the network interface 1033 in order. This request signal is used to request information about the radio broadcast currently received by the user for listening. The radio broadcast information delivery server 1006 corresponds to the radio station that carries the radio broadcast being received.

As a result, the radio broadcasting display control section 1039 receives the radio broadcast information received from the radio broadcast information delivery server 1006 on the network NT1000 via the network interface 1033 and the communication control section 1032 in order. In addition, the radio broadcasting display control section 1039 sends the received radio broadcast information to the display control section 1024. This allows the display section 1025 to display the radio broadcast information (equivalent to the associated information in the first embodiment) comprising a name of the currently received radio program, a title and an artist name of the currently received musical composition, and the like.

(2-3) Functional Circuit Block Configuration of Portal Server 1003

Figure 16:
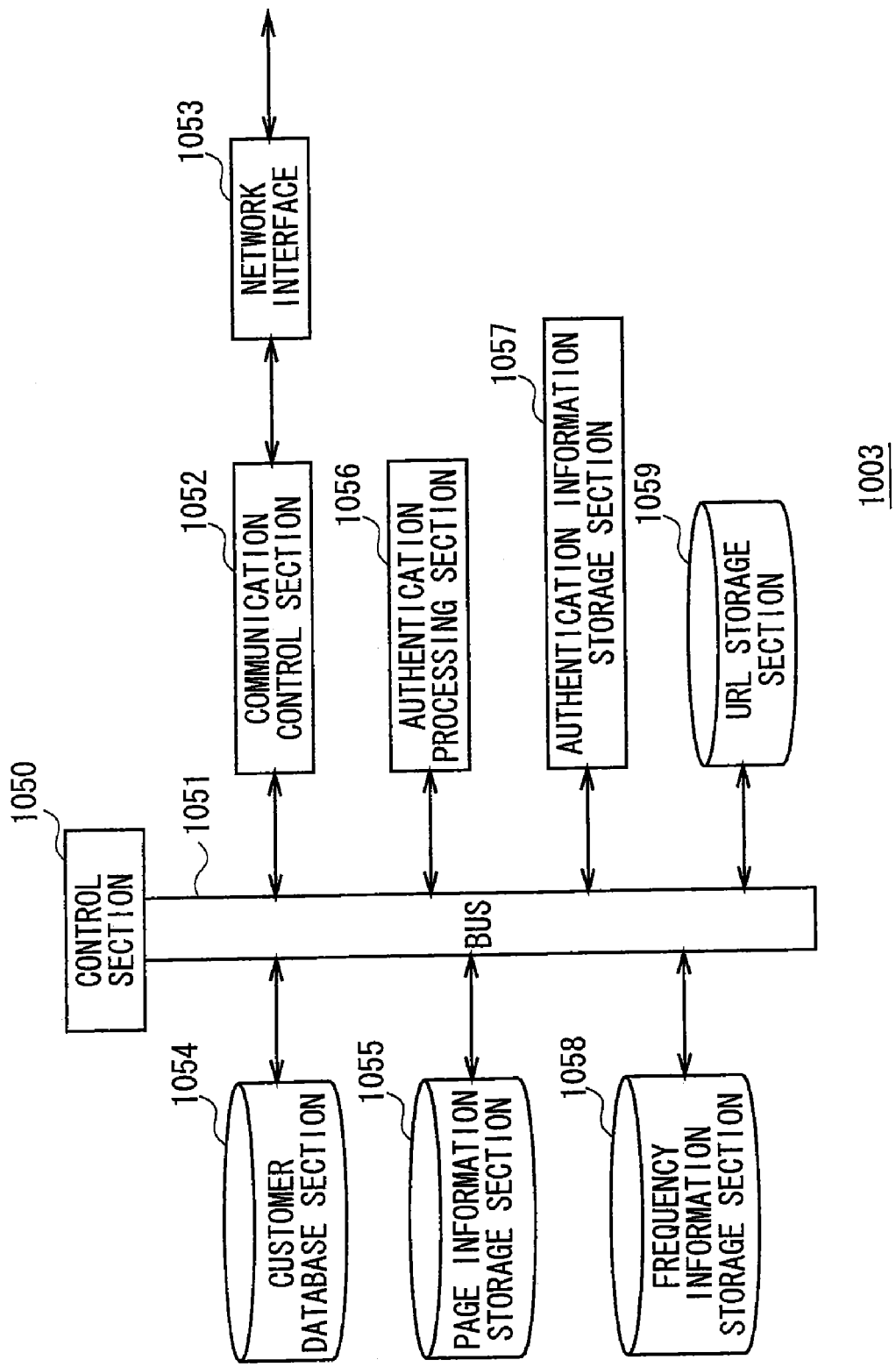
FIG. 16 is a block diagram showing the hardware configuration of a portal server using functional circuit blocks.

With reference to FIG. 16, the following describes the hardware configuration of the portal server 1003 as authentication server using functional circuit blocks. A control section 1050 in the portal server 1003 controls operations of circuits connected via a bus 1051.

Under the control of the control section 1050, a communication control section 1052 interchanges various information with the client terminal 1002, the other servers 1004 through 1007, and the like via a network interface 1053.

A customer database section 1054 registers customer information comprising user ID (identification) information and associated password information of a user who has completed a contract with a service provider of a music related service provision system.

A page information storage section 1055 stores page information and the like managed by the music related service provision system's service provider.

The page information is written in languages such as XML and includes URL (Uniform Resource Locator) information to access a music data delivery server 1004, a trade server 1005, a video broadcast information delivery server 1006, an Internet radio server 1007 and the like.

An authentication processing section 1056 receives the user ID information and the password information sent from the client terminal 1002 via the network interface 1053 and the communication control section 1052 in order. The authentication processing section 1056 then performs a user authentication process to confirm whether or not the customer database section 1054 stores the received user ID information and password information as the customer information.

Upon completion of the user authentication process, the authentication processing section 1056 issues portal authentication result information (authentication session ID information to be described later) indicating the result of the user authentication process. The authentication processing section 1056 temporarily stores the issued portal authentication result information in the authentication information storage section 1057.

Let us assume that the user is authenticated to be a registered user as a result of the user authentication process by the authentication processing section 1056. In this case, the control section 1050 sends page information about a contractor page stored in the page information storage section 1055 as well as the portal authentication result information to the client terminal 1002 via the communication control section 1052 and the network interface 1053 in order.

Next, let us assume that the user is not authenticated to be a registered user as a result of the user authentication process by the authentication processing section 1056. In this case, the control section 1050 may be configured to send authentication error information as well as unsuccessful authentication notification page information indicating the unsuccessful authentication to the client terminal 1002 via the communication control section 1052 and the network interface 1053 in order. The unsuccessful authentication notification page information is stored in the page information storage section 1055.

As a result of performing authentication processes for the user from the music data delivery server 1004, the trade server 1005, the radio broadcast information delivery server 1006 and the like, the authentication processing section 1056 receives portal authentication result information (authentication ticket to be described later) via the network interface 1053 and the communication control section 1052 in order. The portal authentication result information is acquired and sent from the user's client terminal 1002. Then, the authentication processing section 1056 compares the received portal authentication result information with the portal authentication result information that is temporarily stored in the authentication information storage section 1057 corresponding to the user.

The authentication processing section 1056 performs a confirmation process as an authentication process for the portal authentication result information received from the music data delivery server 1004, the trade server 1005, the radio broadcast information delivery server 1006 and the like. Specifically, the authentication processing section 1056 confirms whether or not the portal authentication result information is authenticated. The authentication processing section 1056 then returns confirmation result information indicating a confirmation result to the music data delivery server 1004, the trade server 1005, the radio broadcast information delivery server 1006 and the like via the communication control section 1052 and the network interface 1053 in order.

A frequency information storage section 1058 stores the following associated with each other: an area code such as a postal guide number capable of specifying an area; frequency information indicating broadcast frequencies for radio broadcasts receivable in the area indicated by the area code; a name of a radio station (hereafter referred to as a radio station name) to broadcast the radio broadcast; and a call sign as identification information unique to each radio station.

A URL storage section 1059 stores the following associated with each other: a call sign for radio broadcast corresponding to each radio station; and URL information capable of acquiring radio broadcast information (hereafter referred to specifically as now-on-air information). This information concerns a currently broadcast radio program provided by the radio station corresponding to the call sign and comprises a name of the radio program, a title of the musical composition currently broadcast in the radio program, and the like.

(2-4) Functional Circuit Block Configuration of Music Data Delivery Server 1004

Figure 17:
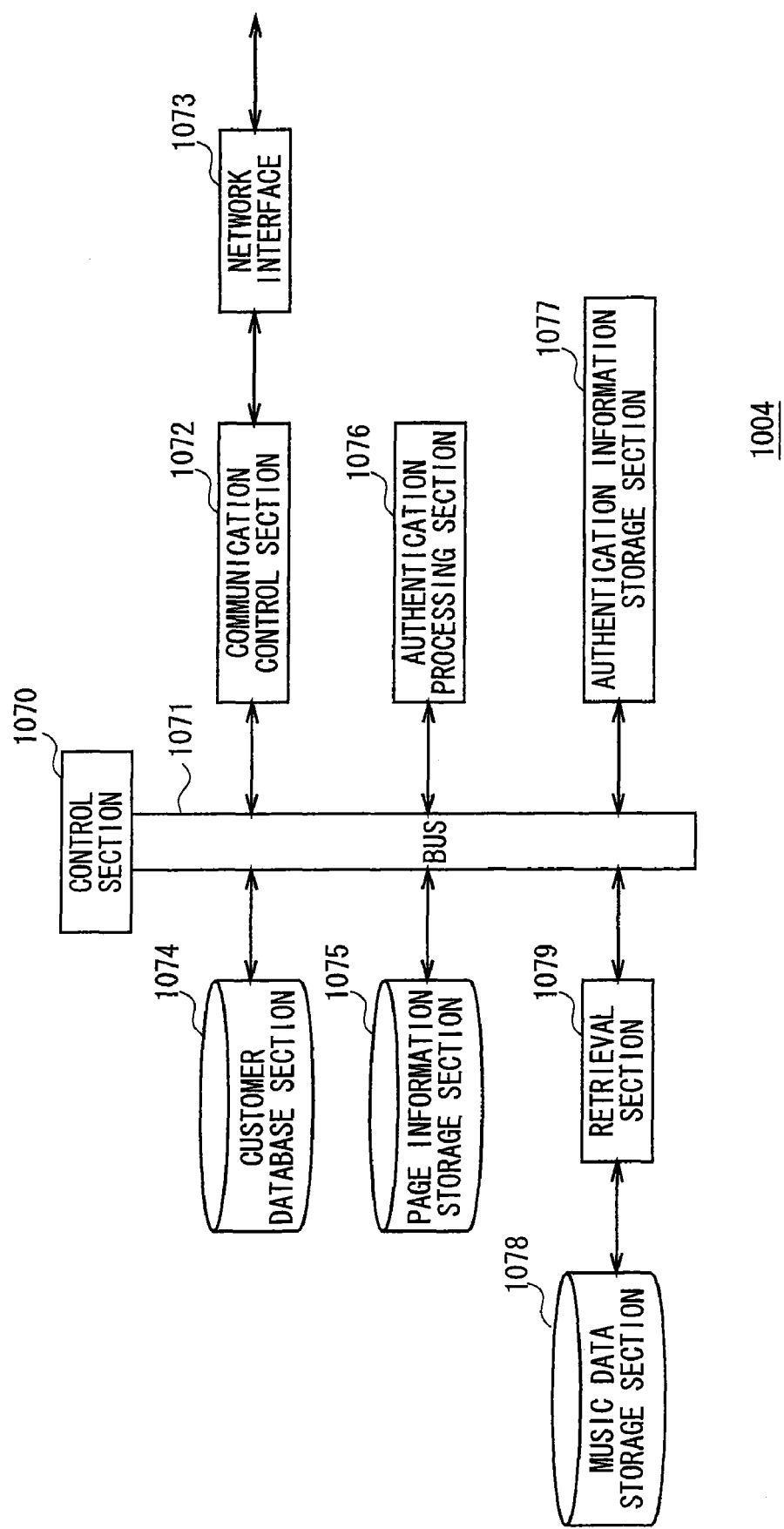
FIG. 17 is a block diagram showing the hardware configuration of a music data delivery server using functional circuit blocks.

Referring now to FIG. 17, the following describes the hardware configuration of the music data delivery server 1004 using functional circuit blocks. A control section 1070 in the music data delivery server 1004 controls operations of circuits connected via a bus 1071.

Under control of the control section 1070, a communication control section 1072 interchanges various information and data such as content data with the client terminal 1002, the portal server 1003, and the like via a network interface 1073.

A customer database section 1074 stores customer information comprising a corresponding combination of user ID information and password information about users who have completed contracts with a service provider of the music data delivery server 1004. An authentication processing section 1075 may have a function to authenticate users based on portal authentication result information that is issued by the portal server 1003 and is transmitted from the client terminal 1002. In such case, the customer database section 1074 may be omitted.

A page information storage section 1076 stores information such as page information about music data delivery pages for presenting downloadable music data. The music data delivery server 1004 manages this information.

The page information about music data delivery pages is written in languages such as XML. This enables a user of the client terminal 1002 to select intended music data to be downloaded.

The control section 1070 receives a page information acquisition request signal transmitted from the client terminal 1002 via the network interface 1073 and the communication control section 1072 in order. The page information acquisition request signal requests page information about music data delivery pages. According to the received page information acquisition request signal, the control section 1070 transmits the page information about music data delivery pages to the client terminal 1002 via the communication control section 1072 and the network interface 1073 in order. The page information about music data delivery pages is stored in the page information storage section 1076.

The authentication processing section 1075 receives the user ID information and the password information about the user of the client terminal 1002 from it via the network interface 1073 and the communication control section 1072 in order. The authentication processing section 1075 then performs a user authentication process to confirm whether or not the customer database section 1074 stores the received user ID information and password information as the customer information.

Further, the authentication processing section 1075 uses a user authentication technique that differs from the user authentication process using the user ID information and the password information. That is to say, the authentication processing section 1075 receives portal authentication result information (authentication ticket to be described later) that is issued by the portal server 1003 and is transmitted from the client terminal 1002 via the network interface 1073 and the communication control section 1072 in order. The authentication processing section 1075 then transmits the received portal authentication result information to the portal server 1003 via the communication control section 1072 and the network interface 1073 in order.

In response to the portal authentication result information transmitted to the portal server 1003, the authentication processing section 1075 receives confirmation result information via the network interface 1073 and the communication control section 1072 in order. The confirmation result information is returned from the portal server 1003 as a result of applying the authentication process (i.e., the above-mentioned confirmation process) to the portal authentication result information. Based on the received confirmation result information, the authentication processing section 1075 confirms whether or not the user is a registered user who completed a contract with the service provider of the music related service provision system 1000.

Upon completion of the user authentication process, the authentication processing section 1075 issues the server authentication result information (service session ID information to be described later) indicating the result of the user authentication process.

Let us assume that the user is authenticated to be a registered user as a result of the user authentication process by the authentication processing section 1075. In this case, the control section 1070 transmits page information as well as the server authentication result information to the client terminal 1002 via the communication control section 1072 and the network interface 1073 in order. The page information is related to a music data delivery page that is reserved for contractors and is stored in the page information storage section 1076.

By contrast, let us assume that the user is not authenticated to be a registered user as a result of the user authentication process by the authentication processing section 1075. In this case, the control section 1070 transmits authentication error information as well as unsuccessful authentication notification page information to the client terminal 1002 via the communication control section 1072 and the network interface 1073 in order. The unsuccessful authentication notification page information is stored in the page information storage section 1076 and indicates unsuccessful authentication.

The authentication information storage section 1077 temporarily stores server authentication result information issued by the authentication processing section 1075. The authentication information storage section 1077 also stores various types of authentication information needed for the authentication processing section 1075 to authenticate users who use the client terminal 1002.

A music data storage section 1078 stores a plurality of music data compressed and encoded in the above-mentioned formats such as ATRAC3 and MP3. The music data are associated with retrieval keys such as content ID information.

As mentioned above, the control section 1070 transmits the page information about the music data delivery page to the client terminal 1002. As a result, the client terminal 1002 transmits a download request signal that stores a retrieval key for retrieving music data intended for download and requests the download of intended music data. The music data delivery server 1004 receives the download request signal via the network interface 1073 and the communication control section 1072 in order. In this case, the retrieval section 1079 retrieves the corresponding retrieval key from the received download request signal.

Based on the retrieval key, the retrieval section 1079 searches a plurality of pieces of music data in the music data storage section 1078 for music data intended for download, i.e., one matching a retrieval condition indicated by the retrieval key.

The control section 1070 then transmits the retrieved music data intended for download to the client terminal 1002 via the communication control section 1072 and the network interface 1073 in order.

At this time, the control section 1070 transmits charging information to the charging server 1008 via the communication control section 1072 and the network interface 1073 in order. The charging information is used to charge the user who downloaded the music data to the client terminal 1002. In this manner, the control section 1070 allows the charging server 1008 to perform a charging process corresponding to the music data downloaded by the user.

(2-5) Functional Circuit Block Configuration of Trade Server 1005

Figure 18:
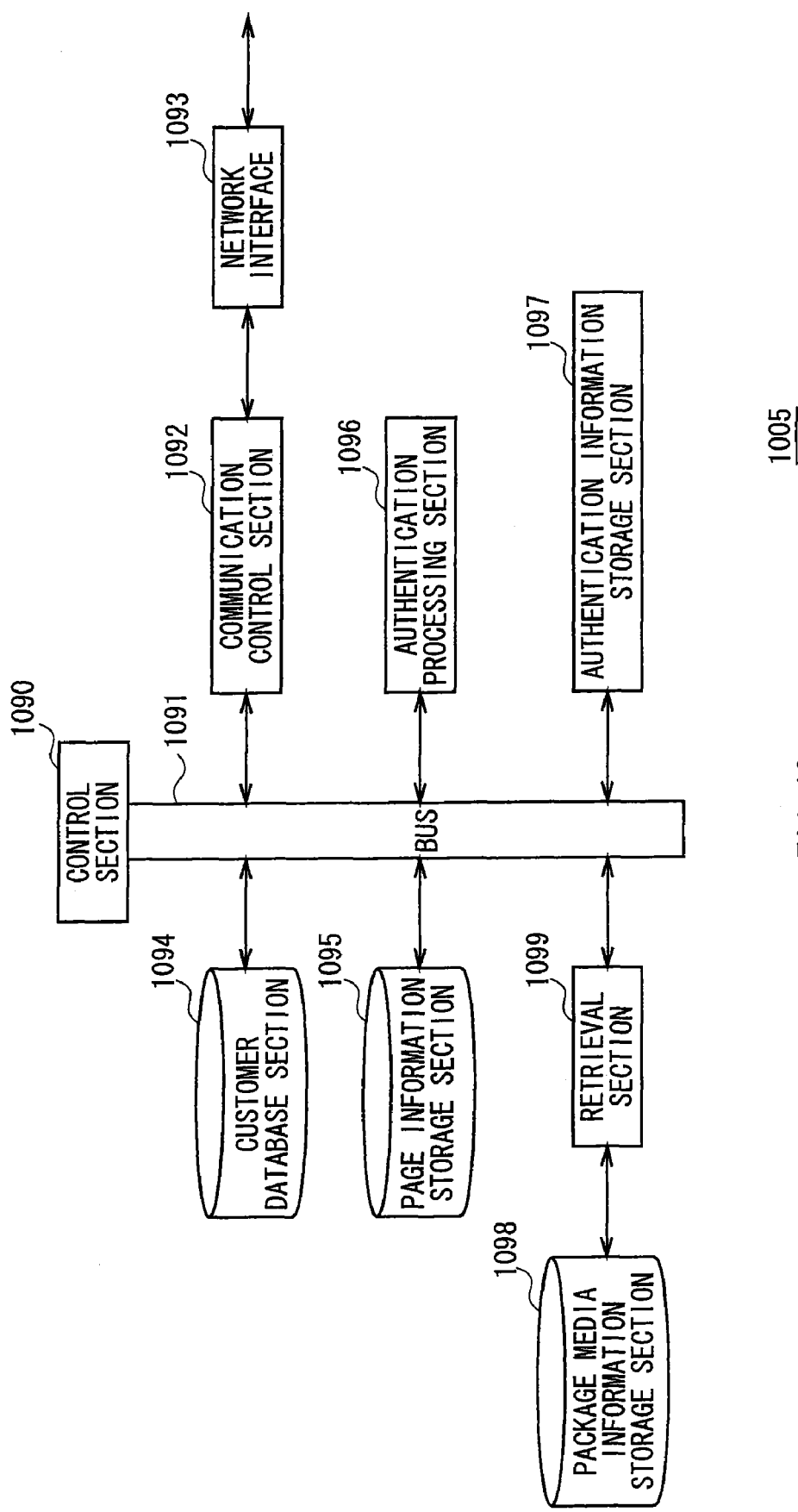
FIG. 18 is a block diagram showing the hardware configuration of a trade server using functional circuit blocks.

Referring now to FIG. 18, the following describes the hardware configuration of the trade server 1005 using functional circuit blocks. A control section 1090 in the trade server 1005 controls operations of circuits connected via a bus 1091.

Under control of the control section 1090, a communication control section 1092 interchanges various information with the client terminal 1002, the portal server 1003, and the like via a network interface 1093.

A customer database section 1094 stores customer information comprising a corresponding combination of user ID information and password information about users who have completed contracts with a service provider of the trade server 1005. An authentication processing section 1095 may have a function to authenticate users based on portal authentication result information that is issued by the portal server 1003 and is transmitted from the client terminal 1002. In such case, the customer database section 1094 may be omitted.

A page information storage section 1096 stores information such as page information about package media sales pages for presenting package media such as CD and DVD for sale. The trade server 1005 manages this information.

The page information about package media sales pages is written in languages such as XML. This enables a user of the client terminal 1002 to select intended package media such as CD and DVD to be purchased.

The control section 1090 receives a page information acquisition request signal transmitted from the client terminal 1002 via the network interface 1093 and the communication control section 1092 in order. The page information acquisition request signal requests page information about package media sales pages. According to the received page information acquisition request signal, the control section 1090 transmits the page information about package media sales pages to the client terminal 1002 via the communication control section 1092 and the network interface 1093 in order. The page information about package media sales pages is stored in the page information storage section 1096.

The authentication processing section 1095 receives the user ID information and the password information about the user of the client terminal 1002 from it via the network interface 1093 and the communication control section 1092 in order. The authentication processing section 1095 then performs a user authentication process to confirm whether or not the customer database section 1094 stores the received user ID information and password information as the customer information.

Further, the authentication processing section 1095 uses a user authentication technique that differs from the user authentication process using the user ID information and the password information. That is to say, the authentication processing section 1095 receives portal authentication result information (authentication ticket to be described later) that is issued by the portal server 1003 and is transmitted from the client terminal 1002 via the network interface 1093 and the communication control section 1092 in order. The authentication processing section 1095 then transmits the received portal authentication result information to the portal server 1003 via the communication control section 1092 and the network interface 1093 in order.

In response to the portal authentication result information transmitted to the portal server 1003, the authentication processing section 1095 receives confirmation result information via the network interface 1093 and the communication control section 1092 in order. The confirmation result information is returned from the portal server 1003 as a result of applying the authentication process (i.e., the above-mentioned confirmation process) to the portal authentication result information. Based on the received confirmation result information, the authentication processing section 1095 confirms whether or not the user is a registered user who completed a contract with the service provider of the music related service provision system 1000.

Upon completion of the user authentication process, the authentication processing section 1095 issues the server authentication result information (service session ID information to be described later) indicating the result of the user authentication process.

Let us assume that the user is authenticated to be a registered user as a result of the user authentication process by the authentication processing section 1095. In this case, the control section 1090 transmits page information as well as the server authentication result information to the client terminal 1002 via the communication control section 1092 and the network interface 1093 in order. The page information is related to a package media sales page that is reserved for contractors and is stored in the page information storage section 1096.

By contrast, let us assume that the user is not authenticated to be a registered user as a result of the user authentication process by the authentication processing section 1095. In this case, the control section 1090 transmits authentication error information as well as unsuccessful authentication notification page information to the client terminal 1002 via the communication control section 1092 and the network interface 1093 in order. The unsuccessful authentication notification page information is stored in the page information storage section 1096 and indicates unsuccessful authentication.

The authentication information storage section 1097 temporarily stores server authentication result information issued by the authentication processing section 1095. The authentication information storage section 1097 also stores various types of authentication information needed for the authentication processing section 1095 to authenticate users who use the client terminal 1002.

A package media information storage section 1098 stores information (hereafter referred to as package media information) about a plurality of package media such as CD and DVD for sale. The package media information is associated with retrieval keys such as package media ID information.

As mentioned above, the control section 1090 transmits the page information about the package media sales page to the client terminal 1002. As a result, the client terminal 1002 transmits a media information request signal that requests package media information about a specific package medium such as CD and DVD. The media information request signal is received via the network interface 1093 and the communication control section 1092 in order. In this case, the retrieval section 1099 retrieves the corresponding retrieval key for retrieving the specific package medium from the received media information request signal.

Based on the retrieval key, the retrieval section 1099 searches a plurality of pieces of package media information in the package media information storage section 1098 for the package media information about the specific package medium, i.e., the information matching a retrieval condition indicated by the retrieval key.

The control section 1090 then transmits the retrieved package media information to the client terminal 1002 via the communication control section 1092 and the network interface 1093 in order. In this manner, the user is provided with the package media information about the specific package media.

As a result, the client terminal 1002 transmits a purchase request signal to request the purchase of the above-mentioned specific package medium. The control section 1090 receives the purchase request signal via the network interface 1093 and the communication control section 1092 in order. The control section 1090 then performs purchase processes such as shipping the specific package medium to the user of the client terminal 1002.

The control section 1090 transmits charging information to the charging server 1008 via the communication control section 1092 and the network interface 1093 in order. The charging information is used to charge the user who purchased the specific package medium. In this manner, the control section 1090 allows the charging server 1008 to perform a charging process corresponding to the user's purchase of the specific package medium.

When the charging server 1008 completes the charging process for the user, the control section 1090 transmits purchase completion information to the client terminal 1002 via the communication control section 1092 and the network interface 1093 in order. The purchase completion information indicates that the purchase of package media is complete.

(2-6) Functional Circuit Block Configuration of Radio Broadcast Information Delivery Server 1006

Figure 19:
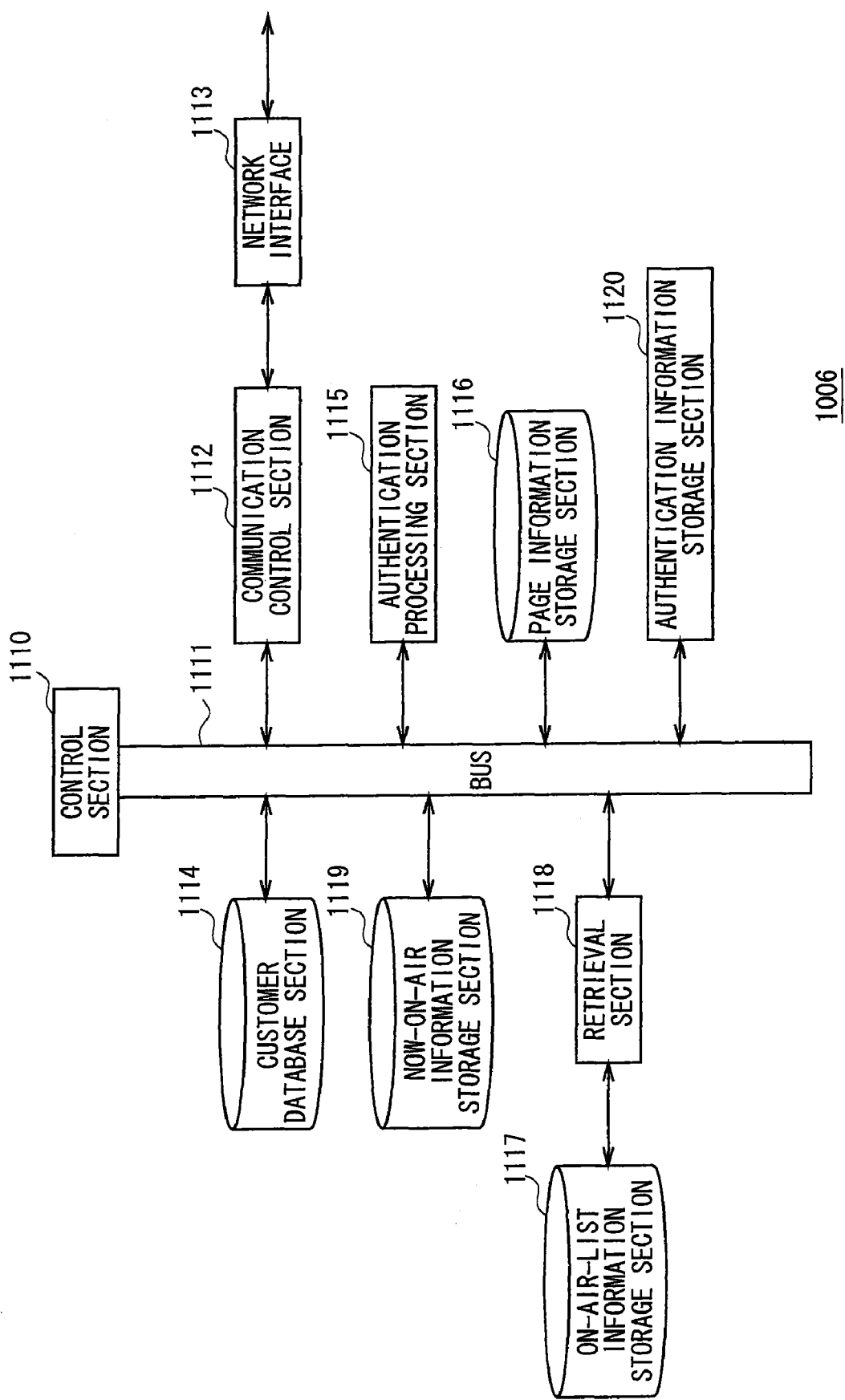
FIG. 19 is a block diagram showing the hardware configuration of a radio broadcast information delivery server using functional circuit blocks.

With reference to FIG. 19, the following describes the hardware configuration of the radio broadcast information delivery server 1006, using functional circuit blocks. A control section 1110 in the radio broadcast information delivery server 1006 controls operations of circuits connected via a bus 1111.

Under the control of the control section 1110, a communication control section 1112 interchanges various information with the client terminal 1002, the portal server 1003, and the like via a network interface 1113.

A customer database section 1114 registers customer information comprising user ID information and associated password information of a user who has completed a contract with a service provider of the radio broadcast information delivery server 1006. The authentication processing section 1115 may have a function to authenticate users based on the portal authentication result information that is sent from the client terminal 1002 and is issued by the portal server 1003. In such case, the customer database section 1114 may not be provided.

There is provided radio broadcast information called on-air-list information. This information is managed by the radio broadcast information delivery server 1006 and concerns the radio program already broadcast by the radio station corresponding to the radio broadcast information delivery server 1006. A page information storage section 1116 stores, for example, page information about an on-air-list information delivery page used to acquire the on-air-list information.

Page information about the on-air-list information delivery page is written in a language such as XML. There is provided an input box or the like that allows a user of the client terminal 1002 to enter retrieval keys for intended on-air-list information. For example, retrieval keys include broadcast date information, names, and the like of radio programs.

An on-air-list information storage section 1117 stores the on-air-list information generated in a list format. The on-air-list information includes: the name of the radio program already broadcasted from the radio station corresponding to the radio broadcast information delivery server 1006; program broadcast start time, program broadcast end time, and the like; and title and artist name of a musical composition broadcasted in the radio program, musical composition broadcast start time, and the like.

The control section 1110 receives a page information acquisition request signal to request the page information about the on-air-list information delivery page from the client terminal 1002 via the network interface 1113 and the communication control section 1112 in order. Corresponding to the received page information acquisition request signal, the control section 1110 sends the page information about the on-air-list information delivery page stored in the page information storage section 1116 to the client terminal 1002 via the communication control section 1112 and the network interface 1113 in order.

After the retrieval key is entered for the page information about the on-air-list information delivery page from the client terminal 1002, the retrieval section 1118 stores the retrieval key to retrieve the intended on-air-list information. When an on-air-list information request signal is transmitted to request download of the on-air-list information, the retrieval section 1118 receives the on-air-list information request signal via the network interface 1113 and the communication control section 1112 in order. The retrieval section 1118 then extracts the retrieval key from the received on-air-list information request signal.

Based on the retrieval key, the retrieval section 1118 searches the entire on-air-list information in the on-air-list information storage section 1117 for the targeted on-air-list information within a specified range corresponding to the retrieval condition indicated by the retrieval key.

As a result, the control section 1110 sends the retrieved targeted on-air-list information to the client terminal 1002 via the communication control section 1112 and the network interface 1113 in order.

A now-on-air information storage section 1119 stores radio broadcast information called now-on-air information. This information comprises: program name, program broadcast start time, and program broadcast end time of a radio program currently broadcasted from the radio station corresponding to the radio broadcast information delivery server 1006; and title, artist name, musical composition broadcast start time, and the like of a musical composition currently broadcasted in the radio program.

The client terminal 1002 sends not only a now-on-air information request signal to request to acquire the now-on-air information, but also user ID information and password information of the user who uses the client terminal 1002. The authentication processing section 1115 receives these pieces of information via the network interface 1113 and the communication control section 1112 in order. The authentication processing section 1115 then performs the user authentication process to confirm whether or not the received user ID information and password information are registered as the customer information in the customer database section 1114.

Further, the authentication processing section 1115 uses a user authentication technique different from the user authentication process that uses the user ID information and the password information. That is to say, the client terminal 1002 sends the portal authentication result information (authentication ticket to be described later) that is issued from the portal server 1003. The authentication processing section 1115 receives this information via the network interface 1113 and the communication control section 1112 in order. The authentication processing section 1115 then sends the received portal authentication result information to the portal server 1003 via the communication control section 1112 and the network interface 1113 in order.

After the authentication processing section 1115 sends the portal authentication result information to the portal server 1003, the portal server 1003 returns confirmation result information as a result of performing the authentication process (i.e., the above-mentioned confirmation process) corresponding to the portal authentication result information. The authentication processing section 1115 receives the confirmation result information via the network interface 1113 and the communication control section 1112 in order. Based on the received confirmation result information, the authentication processing section 1115 determines whether or not the user is a registered user who has completed a contract with the service provider of a music related service provision system 1000.

After terminating the user authentication process, the authentication processing section 1115 issues server authentication result information (service session ID information to be described later) indicating the result of the user authentication process.

Let us assume that the user is authenticated to be a registered user as a result of the user authentication process performed by the authentication processing section 1115. In this case, the control section 1110 sends the now-on-air information stored in the now-on-air information storage section 1119 as well as the server authentication result information to the client terminal 1002 via the communication control section 1112 and the network interface 1113 in order.

By contrast, let us assume that the user is not authenticated to be a registered user as a result of the user authentication process performed by the authentication processing section 1115. In this case, the control section 1110 sends authentication error information as well as unsuccessful authentication notification page information to the client terminal 1002 via the communication control section 1112 and the network interface 1113 in order. The unsuccessful authentication notification page information is stored in the page information storage section 1116 and indicates unsuccessful authentication.

In this manner, the control section 1110 functions in response to a request to acquire the now-on-air information from the user as follows. When the user is authenticated to be a registered user, the control section 1110 provides the now-on-air information. When the user is not authenticated to be a registered user, however, the control section 1110 prevents the user from receiving radio broadcast information delivery services provided by the radio broadcast information delivery server 1006 such as the now-on-air information delivery service.

The authentication information storage section 1120 temporarily stores the server authentication result information issued from the authentication processing section 1115. The authentication information storage section 1120 also stores various authentication information needed when the authentication processing section 1115 authenticates a user of the client terminal 1002.

(2-7) Process Overview of Each Server

With reference to sequence charts in FIGS. 20 through 25, the following outlines processes performed between the client terminal 1002 and the portal server 1003 and processes performed between the client terminal 1002 and each of the music data delivery server 1004, the trade server 1005, and the radio broadcast information delivery server 1006.

(2-7-1) User Authentication Process between Client Terminal 1002 and Portal Server 1003

Figure 20:
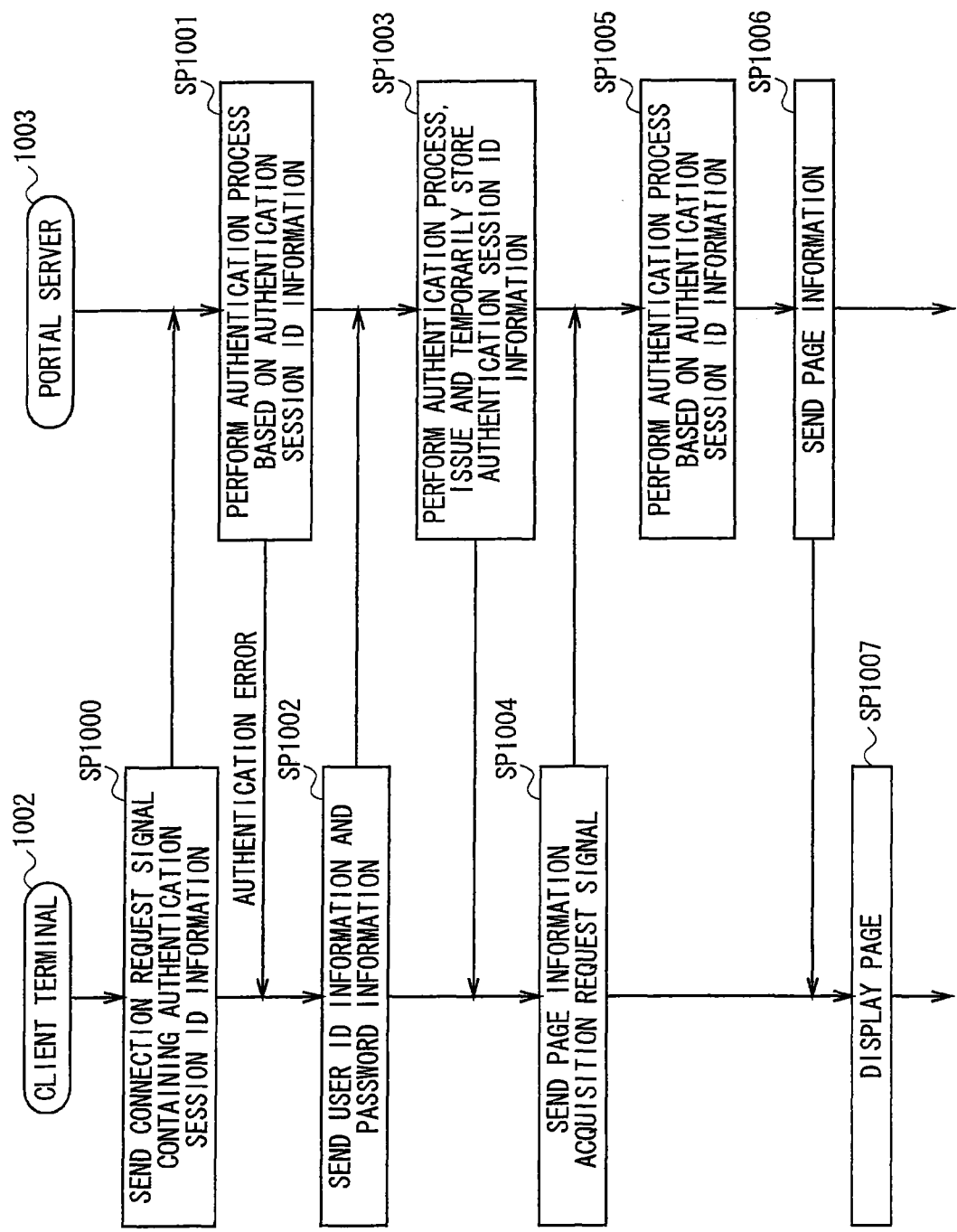
FIG. 20 is a sequence chart showing a user authentication process between the client terminal and the portal server.

With reference to FIG. 20, the following describes a user authentication process performed between the client terminal 1002 and the portal server 1003.

The control section 1023 corresponds to the client terminal 1002 for the user who contracts with the service provider of the music related service provision system 1000. For example, the user performs an operation to turn on the client terminal 1002. Alternatively, the user presses a specific operation button on the operation input section 1020. In response to such operation, the operation input section 1020 recognizes an operation input signal. The input processing section 1021 converts this signal into an operation command. The control section 1023 is supplied with this command and starts an authentication request process.

After starting the authentication request process, the control section 1023, at step SP1000, generates a connection request signal containing the authentication session ID information and the like temporarily stored in the authentication information storage section 1038. The control section 1023 sends the generated connection request signal to the portal server 1003 via the communication control section 1032 and the network interface 1033 in order.

The client terminal 1002 establishes a communication connection with the portal server 1003 to perform various processes such as the user authentication process. Each time this communication connection is established, the portal server 1003 issues the authentication session ID information as identification information to identify respective communication connection states (i.e., sessions).

For the use with the user authentication process and the like, the authentication session ID information is assigned with a specified valid period (e.g., approximately one minute) with reference to the time of issuance from the portal server 1003.

The client terminal 1002 acquires the authentication session ID information from the portal server 1003. There may be a case where the client terminal 1002 cannot supply the authentication session ID information to the portal server 1003 within the valid period. In such case, the portal server 1003 determines cancellation of the communication connection state specified by the authentication session ID information.

In this manner, the portal server 1003 prevents the previously issued authentication session ID information from being falsely used by a user not contracted with the service provider of the music related service provision system 1.

The authentication information storage section 1038 temporarily stores the authentication session ID information. This authentication session ID information was issued by the portal server 1003 that established communication connection with the client terminal 1002 to perform the user authentication process and the like.

The client terminal 1002 sends a connection request signal. In response to this, at step SP1001, the control section 1050 of the portal server 1003 receives the connection request signal via the network interface 1053 and the communication control section 1052 in order. The received connection request signal contains the authentication session ID information and the like. The control section 1050 sends the authentication session ID information and the like to the authentication processing section 1056.

Under the control of the control section 1050, the authentication processing section 1056 performs the user authentication process based on the authentication session ID information and the like received as the connection request signal from the client terminal 1002.

As a result, the authentication processing section 1056 may not be able to authenticate the user of the client terminal 1002 to be a registered user due to expiration of the valid period specified in the authentication session ID information and the like received from the client terminal 1002. In such case, the control section 1050 sends the authentication error information indicating an authentication error to the client terminal 1002 via the communication control section 1052 and the network interface 1053 in order.

At step SP1002, the control section 1023 of the client terminal 1002 receives the authentication error information sent from the portal server 1003 via the network interface 1033 and the communication control section 1032 in order. In response to this, the control section 1023 reads the user ID information, the password information, and the like stored in the authentication information storage section 1038. The control section 1023 sends the read user ID information, password information, and the like to the portal server 1003 via the communication control section 1032 and the network interface 1033 in order.

At step SP1003, the control section 1050 of the portal server 1003 receives the user ID information, the password information, and the like sent from the client terminal 1002 via the network interface 1053 and the communication control section 1052 in order. The control section 1050 sends these pieces of information to the authentication processing section 1056.

Under the control of the control section 1050, the authentication processing section 1056 performs the user authentication process. Specifically, the authentication processing section 1056 checks if the received user ID information, password information, and the like are included in the customer information registered to the customer database section 1054.

As a result, the authentication processing section 1056 may authenticate the user of the client terminal 1002 to be a registered user. In this case, under the control of the control section 1050, the authentication processing section 1056 issues the portal authentication result information, i.e., the authentication session ID information and the like about communication connection state between the client terminal 1002 and the portal server 1003 at this time. In addition, the authentication processing section 1056 temporarily stores the authentication session ID information and the like in the authentication information storage section 1057.

After the authentication processing section 1056 issued the authentication session ID information and the like to the client terminal 1002, the control section 1050 sends these pieces of information to the client terminal 1002 via the communication control section 1052 and the network interface 1053 in order.

At step SP1004, the control section 1023 of the client terminal 1002 receives the authentication session ID information and the like sent from the portal server 1003 via the network interface 1033 and the communication control section 1032 in order. The control section 1023 then sends the received authentication session ID information and the like to the authentication processing section 1037.

Under the control of the control section 1023, the authentication processing section 1037 temporarily stores the received authentication session ID information and the like in the authentication information storage section 1038.

The control section 1023 receives the page information acquisition request signal from the portal server 1003 to request the portal server 1003 for the page information. The control section 1023 sends the received signal together with the authentication session ID information and the like temporarily stored in the authentication information storage section 1038 to the portal server 1003 via the communication control section 1032 and the network interface 1033 in order.

At step SP1005, the control section 1050 of the portal server 1003 receives the page information acquisition request signal, the authentication session ID information, and the like sent from the client terminal 1002 via the network interface 1053 and the communication control section 1052 in order. The control section 1050 sends the received authentication session ID information and the like to the authentication processing section 1056.

Under the control of the control section 1050, the authentication processing section 1056 performs the user authentication process. Specifically, the authentication processing section 1056 compares the received authentication session ID information and the like with the authentication session ID information and the like that were issued to the client terminal 1002 at the above-mentioned step SP1003 and were temporarily stored in the authentication information storage section 1057.

As a result, at step SP1006, the authentication processing section 1056 authenticates the user of the client terminal 1002 to be a registered user. The authentication processing section 1056 determines that the terminal 1002 issued the valid acquisition request for the page information. The authentication processing section 1056 extends the valid period for the authentication session ID information and the like issued to the client terminal 1002.

At this time, the control section 1050 reads the user-requested page information from the page information storage section 1055. The control section 1050 sends the read page information, the authentication session ID information, and the like to the client terminal 1002 via the communication control section 1052 and the network interface 1053 in order. At this time, the authentication session ID information and the like are assigned with the valid period extended by the authentication processing section 1056.

At step SP1007, the control section 1023 of the client terminal 1002 receives the page information sent from the portal server 1003 and the authentication session ID information with the extended valid period and the like via the network interface 1033 and the communication control section 1032 in order. The control section 1023 sends the received page information to the page information generation section 1036 and sends the authentication session ID information with the extended valid period and the like to the authentication processing section 1037.

Based on the page information supplied from the control section 1023, the page information generation section 1036 generates video data embedded with links to the music data delivery server 1004, the trade server 1005, and the radio broadcast information delivery server 1006. The page information generation section 1036 sends the generated video data to the display control section 1024.

The display control section 1024 applies a digital-analog conversion process to the video data supplied from the page information generation section 1036. The display control section 1024 then sends the converted analog video signal to the display section 1025. As a result, the display section 1025 displays the page of the portal server 1003 as a video based on the analog video signal.

The authentication processing section 1037 updates the authentication session ID information and the like temporarily stored at the above-mentioned step SP1004 to the authentication session ID information with the extended valid period and the like as follows. Under the control of the control section 1023, the authentication processing section 1037 temporarily stores the authentication session ID information with the extended valid period and the like received from the portal server 1003 in the authentication information storage section 1038 so as to overwrite the authentication session ID information having the valid period not extended and the like.

(2-7-2) User Authentication Process between Client Terminal 1002 and each of servers 1004 through 1006

Figure 21:
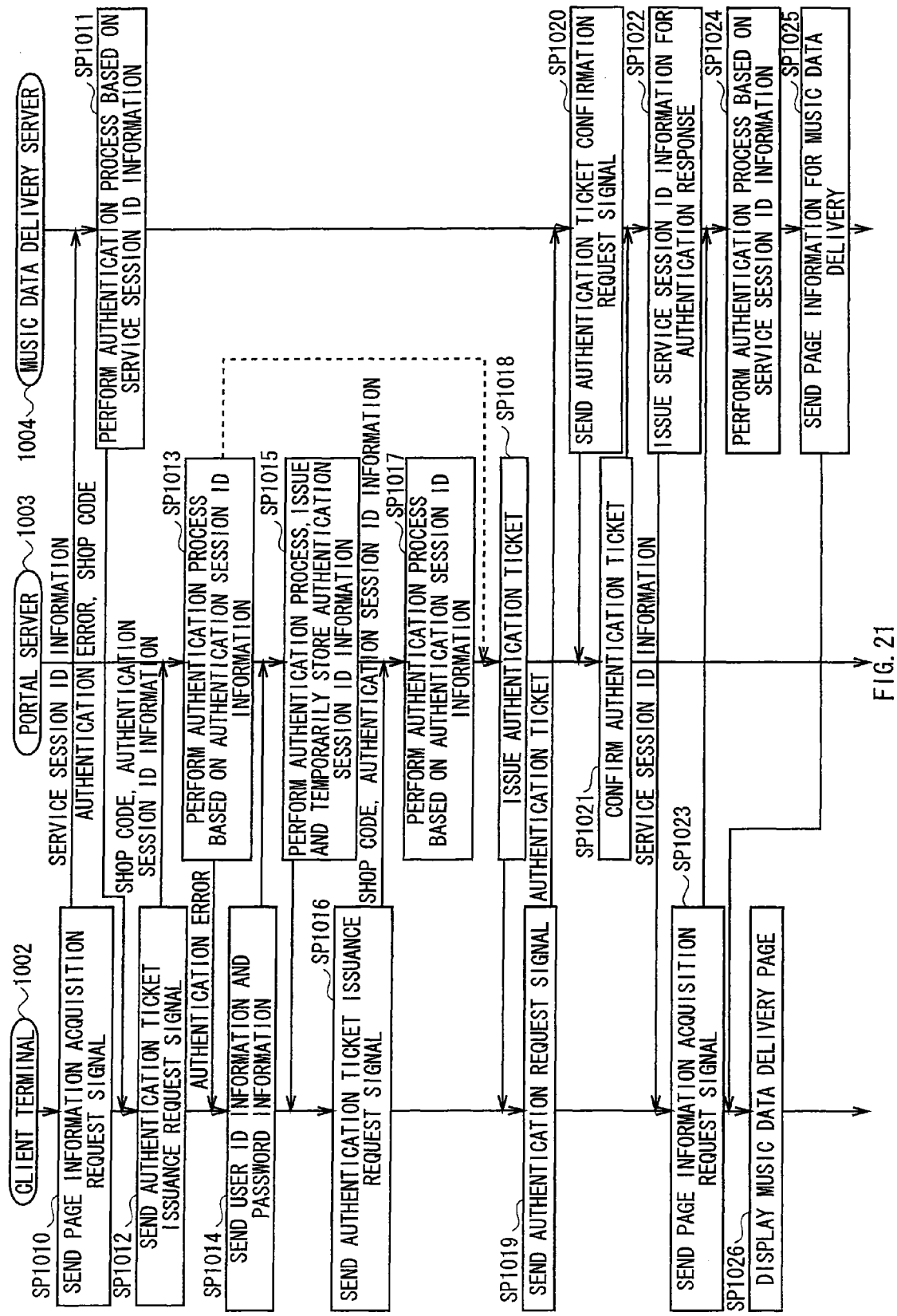
FIG. 21 is a sequence chart showing a user authentication process between the client terminal and the music data delivery server.

With reference to FIG. 21, the following describes the user authentication process performed between the client terminal 1002 and each of the music data delivery server 1004, the trade server 1005, and the radio broadcast information delivery server 1006.

As an example of the user authentication process, the client terminal 1002 once acquires the page information from the portal server 1003 as mentioned above with reference to FIG. 20. The page information contains links for access to the music data delivery server 1004, the trade server 1005, and the radio broadcast information delivery server 1006 to perform the user authentication process. This user authentication process is hereinafter referred to as an indirect access authentication process.

As another example of the user authentication process, the client terminal 1002 does not acquire the page information from the portal server 1003. Instead, previously "bookmarked" URL information and the like are used for direct access to the music data delivery server 1004, the trade server 1005, and the radio broadcast information delivery server 1006. This user authentication process is hereafter referred to as a direct access authentication process.

The indirect access authentication process can be performed just the same in any combinations of the client terminal 1002 and the music data delivery server 1004, the trade server 1005, and the radio broadcast information delivery server 1006.

The direct access authentication process can be also performed just the same in any combinations of the client terminal 1002 and the music data delivery server 1004, the trade server 1005, and the radio broadcast information delivery server 1006.

The indirect access authentication process differs from the direct access authentication process only as to a manner of acquiring URL information used by the client terminal 1002 for access to the music data delivery server 1004, the trade server 1005, and the radio broadcast information delivery server 1006. After the URL information is acquired, the indirect access authentication process and the direct access authentication process can be performed just the same.

In the following description, the music data delivery server 1004 represents an access destination of the client terminal 1002 for simplicity. Further, the indirect access authentication process and the direct access authentication process are described as one user authentication process.

At step SP1010, the control section 1023 of the client terminal 1002 follows the URL information embedded as links in the page information or the URL information and the like already registered as bookmarks. The control section 1023 transmits the service session ID information and the like read from the authentication information storage section 1038 as well as a page information acquisition request signal to the music data delivery server 1004 via the communication control section 1032 and the network interface 1033 in order. The page information acquisition request signal requests to acquire the page information about music data delivery pages. The page information concerns package media sales pages and on-air-list information delivery pages for the trade server 1005 and the radio broadcast information delivery server 1006.

The client terminal 1002 establishes a communication connection with the music data delivery server 1004, the trade server 1005, and the radio broadcast information delivery server 1006 to perform various processes such as the user authentication process. Each time this communication connection is established, the music data delivery server 1004, the trade server 1005, and the radio broadcast information delivery server 1006 accessed by the client terminal 1002 issue the service session ID information as identification information to identify respective communication connection states (i.e., sessions).

For the use with the user authentication process and the like, the service session ID information, like the authentication session ID information, is assigned with a specified valid period (e.g., approximately one minute) with reference to the time of issuance from the music data delivery server 1004, the trade server 1005, and the radio broadcast information delivery server 1006.

The client terminal 1002 acquires the service session ID information from the servers 1004 through 1006. There may be a case where the client terminal 1002 cannot supply the service session ID information to the information-issuing servers such as the music data delivery server 1004, the trade server 1005, and the radio broadcast information delivery server 1006 within the valid period. In such case, the information-issuing servers such as the music data delivery server 1004, the trade server 1005, and the radio broadcast information delivery server 1006 determine cancellation of the communication connection state specified by the service session ID information.

In this manner, the music data delivery server 1004, the trade server 1005, and the radio broadcast information delivery server 1006 prevent the previously issued service session ID information from being falsely used by a user not contracted with the service provider of the music related service provision system 1.

The authentication information storage section 1038 temporarily stores the service session ID information. This service session ID information was issued by the music data delivery server 1004, the trade server 1005, and the radio broadcast information delivery server 1006 that established communication connection with the client terminal 1002 to perform the user authentication process and the like.

At step SP1011, the control section 1070 of the music data delivery server 1004 receives the page information acquisition request signal, the service session ID information, and the like transmitted from the client terminal 1002 via the network interface 1073 and the communication control section 1072 in order. The control section 1070 transmits the received service session ID information and the like to the authentication processing section 1075.

Under the control of the control section 1070, the authentication processing section 1075 performs the user authentication process. Specifically, the authentication processing section 1075 compares the received service session ID information and the like with the service session ID information and the like temporarily stored in the authentication information storage section 1077.

As a result, the authentication processing section 1075 may not be able to authenticate the user of the client terminal 1002 to be a registered user, e.g., due to expiration of the valid period for the service session ID information received from the client terminal 1002. In such case, the authentication processing section 1075 determines that the client terminal 1002 issued an invalid acquisition request for the page information about the music data delivery page.

In this case, the control section 1070 transmits authentication error information and a shop code to the client terminal 1002 via the communication control section 1072 and the network interface 1073 in order. The authentication error information indicates an authentication error. The shop code is provided to identify the music data delivery server 1004.

At step SP1012, the control section 1023 of the client terminal 1002 receives the authentication error information and the shop code transmitted from the music data delivery server 1004 via the network interface 1033 and the communication control section 1032 in order. According to the received authentication error information, the control section 1023 determines that the music data delivery server 1004 does not authenticate the user as a registered user. In addition, the control section 1023 temporarily stores the shop code received from the music data delivery server 1004 in the authentication information storage section 1038.

The control section 1023 generates an authentication ticket issuance request signal that requests the portal server 1003 to issue an authentication ticket for access to the music data delivery server 1004. The control section 1023 then transmits the generated authentication ticket issuance request signal, the shop code of the music data delivery server 1004, the authentication session ID information, and the like to the portal server 1003 via the communication control section 1032 and the network interface 1033 in order. It should be noted that the authentication session ID information and the like are already received from the portal server 1003 and are temporarily stored in the authentication information storage section 1038.

At step SP1013, the control section 1050 of the portal server 1003 receives the authentication ticket issuance request signal, the shop code, the authentication session ID information, and the like sent from the client terminal 1002 via the network interface 1053 and the communication control section 1052 in order. The control section 1050 then sends these pieces of information to the authentication processing section 1056.

Under the control of the control section 1050, the authentication processing section 1056 performs the user authentication process. Specifically, the control section 1056 compares the authentication session ID information and the like with the authentication session ID information and the like temporarily stored in the authentication information storage section 1057.

As a result, the authentication processing section 1056 may not be able to authenticate the user of the client terminal 1002 to be a registered user, e.g., due to expiration of the valid period for the authentication session ID information received from the client terminal 1002. In such case, the authentication processing section 1056 determines that the client terminal 1002 issued an invalid acquisition request for the authentication ticket.

In this case, the control section 1050 sends authentication error information indicating an authentication error to the client terminal 1002 via the communication control section 1052 and the network interface 1053 in order.

By contrast, there may be a case where the valid period still takes effect for the authentication session ID information received from the client terminal 1002. In such case, the authentication processing section 1056 authenticates the user of the client terminal 1002 to be a registered user. The authentication processing section 1056 determines that the client terminal 1002 issues a valid request for the authentication ticket. In this case, the control section 1050 moves to step SP1018 to be described later.

At step SP1014, the control section 1023 of the client terminal 1002 receives the authentication error information sent from the portal server 1003 via the network interface 1033 and the communication control section 1032 in order. The control section 1023 then reads the user ID information, the password information, and the like stored in the authentication information storage section 1038. In addition, the control section 1023 sends the read user ID information, the password information, and the like to the portal server 1003 via the communication control section 1032 and the network interface 1033 in order.

At step SP1015, the control section 1050 of the portal server 1003 receives the user ID information, the password information, and the like sent from the client terminal 1002 via the network interface 1053 and the communication control section 1052 in order. The control section 1050 then sends these pieces of information to the authentication processing section 1056.

Under the control of the control section 1050, the authentication processing section 1056 performs the user authentication process. Specifically, the authentication processing section 1056 checks whether or not the customer information registered to the customer database section 1054 contains the received user ID information, the password information, and the like.

As a result, the authentication processing section 1056 authenticates the user of the client terminal 1002 to be a registered user. Under the control of the control section 1050, the authentication processing section 1056 issues the portal authentication result information, i.e., the authentication session ID information and the like about the state of communication connection between the client terminal 1002 and the portal server 1003 at the present time. The authentication processing section 1056 temporarily stores the issued authentication session ID information and the like in the authentication information storage section 1057.

After the authentication processing section 1056 issues the authentication session ID information and the like to the client terminal 1002, the control section 1050 sends the authentication session ID information and the like to the client terminal 1002 via the communication control section 1052 and the network interface 1053 in order.

At step SP1016, the control section 1023 of the client terminal 1002 receives the authentication session ID information and the like sent from the portal server 1003 via the network interface 1033 and the communication control section 1032 in order. The authentication processing section 1037 temporarily stores the received authentication session ID information and the like in the authentication information storage section 1038.

The control section 1023 generates an authentication ticket issuance request signal that re-requests the portal server 1003 to issue an authentication ticket. The control section 1023 sends the generated authentication ticket issuance request signal as well as the shop code temporarily stored in the authentication information storage section 1038 and the authentication session ID information and the like temporarily stored at this time to the portal server 1003 via the communication control section 1032 and the network interface 1033 in order.

According to the embodiment, the client terminal 1002 temporarily stores the shop code in the authentication information storage section 1038. The present invention is not limited thereto. When performing the process at steps SP1012 through SP1016, the client terminal 1002 can sequentially exchange the shop code with the portal server 1003. In this manner, the client terminal 1002 need not temporarily store the shop code in the authentication information storage section 1038. Nevertheless, it is possible to send the shop code to the portal server 1003 at step SP1016.

At step SP1017, the control section 1050 of the portal server 1003 receives the authentication ticket issuance request signal, the shop code, the authentication session ID information, and the like sent from the client terminal 1002 via the network interface 1053 and the communication control section 1052 in order. The control section 1050 sends the received authentication ticket issuance request signal and the like to the authentication processing section 1056.

Under the control of the control section 1050, the authentication processing section 1056 performs the user authentication process. Specifically, the authentication processing section 1056 compares the received authentication session ID information and the like with the authentication session ID information and the like temporarily stored in the authentication information storage section 1057.

As a result, there may be a case where the valid period still takes effect for the authentication session ID information and the like received from the client terminal 1002. In such case, the authentication processing section 1056 authenticates the user of the client terminal 1002 to be a registered user. The authentication processing section 1056 determines that the client terminal 1002 issues a valid request for the authentication ticket.

At step SP1018, under the control of the control section 1050, based on the shop code and the authentication ticket issuance request signal received from the client terminal 1002 at the above-mentioned step SP1017. The authentication processing section 1056 issues the portal authentication result information, i.e., an authentication ticket and the like to enable access to the music data delivery server 1004 indicated by the shop code.

Under the control of the control section 1050, the authentication processing section 1056 temporarily stores the issued authentication ticket and the like in the authentication information storage section 1057. In addition, the authentication processing section 1056 extends the valid period for the authentication session ID information and the like issued to the client terminal 1002.

That is to say, the authentication processing section 1056 has issued the authentication ticket and the like and extended the valid period of the authentication session ID information and the like. Thereafter, the control section 1050 sends these authentication ticket and the like and authentication session ID information and the like to the client terminal 1002 via the communication control section 1052 and the network interface 1053 in order.

At step SP1019, the control section 1023 of the client terminal 1002 receives the authentication ticket and the like sent from the portal server 1003 and the authentication session ID information with the extended valid period via the network interface 1033 and the communication control section 1032 in order. The control section 1023 sends the received authentication session ID information to the authentication processing section 1037.

The control section 1023 sends the authentication ticket and the like received from the portal server 1003 together with the authentication request signal to the music data delivery server 1004 via the communication control section 1032 and the network interface 1033 in order.

At this time, under the control of the control section 1023, the authentication processing section 1037 temporarily stores the authentication session ID information having the extended valid period received from the portal server 1003 in the authentication information storage section 1038 so as to overwrite the authentication session ID information having the valid period not extended. In this manner, the authentication processing section 1037 updates the authentication session ID information temporarily stored at the above-mentioned step SP1016 to the authentication session ID information having the extended valid period.

At step SP1020, the control section 1070 of the music data delivery server 1004 receives the authentication request signal, the authentication ticket, and the like transmitted from the client terminal 1002 via the network interface 1073 and the communication control section 1072 in order.

The control section 1070 transmits the authentication ticket and the like received from the client terminal 1002 together with an authentication ticket confirmation request signal for requesting confirmation of the authentication ticket and the like to the portal server 1003 via the communication control section 1072 and the network interface 1073 in order.

At step SP1021, the control section 1050 of the portal server 1003 receives the authentication ticket confirmation request signal, the authentication ticket, and the like transmitted from the music data delivery server 1004 via the network interface 1053 and the communication control section 1052 in order. The control section 1050 then transmits the received authentication ticket confirmation request signal, the authentication ticket, and the like to the authentication processing section 1056.

Under the control of the control section 1050, the authentication processing section 1056 performs a confirmation process for the authentication ticket received from the music data delivery server 1004 in response to the authentication ticket confirmation request signal. Specifically, the authentication processing section 1056 compares the received authentication ticket and the like with the authentication ticket and the like temporarily stored in the authentication information storage section 1057.

As a result, the authentication processing section 1056 confirms that the genuine authentication ticket and the like are received from the music data delivery server 1004. In this case, the control section 1050 transmits confirmation result information to the music data delivery server 1004 via the communication control section 1052 and the network interface 1053 in order. The confirmation result information indicates that the received authentication ticket and the like are confirmed to be genuine.

At step SP1022, the control section 1070 of the music data delivery server 1004 receives the confirmation result information transmitted from the portal server 1003 via the network interface 1073 and the communication control section 1072 in order. The control section 1070 transmits the received confirmation result information to the authentication processing section 1075.

Under control of the control section 1070, the authentication processing section 1075 responds to the confirmation result information and issues server authentication result information, i.e., service session ID information and the like about the state of communication connection between the client terminal 1002 and the music data delivery server 1004 at the present time. In addition, the authentication processing section 1075 temporarily stores the issued service session ID information and the like in the authentication information storage section 1077.

After the authentication processing section 1075 issued the service session ID information and the like to the client terminal 1002, the control section 1070 transmits these pieces of information to the client terminal 1002 via the communication control section 1072 and the network interface 1073 in order.

At step SP1023, the control section 1023 of the client terminal 1002 receives the service session ID information and the like sent from the music data delivery server 1004 via the network interface 1033 and the communication control section 1032 in order. The authentication processing section 1037 temporarily stores the received service session ID information and the like in the authentication information storage section 1038.

The control section 1023 transmits the page information acquisition request signal, the service session ID information, and the like to the music data delivery server 1004 via the communication control section 1032 and the network interface 1033 in order. The page information acquisition request signal requests the page information about the music data delivery page. The service session ID information is temporarily stored in the authentication information storage section 1038.

As step SP1024, the control section 1070 of the music data delivery server 1004 receives the page information acquisition request signal, the service session ID information, and the like transmitted from the client terminal 1002 via the network interface 1073 and the communication control section 1072 in order. The control section 1070 then transmits the received service session ID information and the like to the authentication processing section 1075.

Under the control of the control section 1070, the authentication processing section 1075 performs the user authentication process. Specifically, the control section 1070 compares the received service session ID information and the like with the service session ID information and the like that are already issued to the client terminal 1002 at the above-mentioned step SP1022 and are temporarily stored in the authentication information storage section 1077.

As a result, there may be a case where the valid period still takes effect for the service session ID information and the like received from the client terminal 1002. In such case, the authentication processing section 1075 authenticates the user of the client terminal 1002 to be a registered user. The authentication processing section 1075 determines that the client terminal 1002 issues a valid request to acquire the page information about the music data delivery page.

The control section 1070 then proceeds to the next step SP1025. At step SP1025, the control section 1070 reads the page information about the user-requested music data delivery page from the page information storage section 1076. In addition, the control section 1070 allows the authentication processing section 1075 to extend the valid period for the service session ID information and the like issued to the client terminal 1002.

The control section 1070 transmits the page information about the music data delivery page read from the page information storage section 1076 together with the service session ID information and the like to the client terminal 1002 via the communication control section 1072 and the network interface 1073 in order. The service session ID information and the like have the valid period extended by the authentication processing section 1075.

At step SP1026, the control section 1023 of the client terminal 1002 receives the page information about the music data delivery page, the service session ID information having the extended valid period, and the like from the music data delivery server 1004 via the network interface 1033 and the communication control section 1032 in order. The control section 1023 transmits the page information about the received music data delivery page to the page information generation section 1036. In addition, the control section 1023 transmits the received service session ID information and the like to the authentication processing section 1037.

Under the control of the control section 1023, the authentication processing section 1037 temporarily stores the received service session ID information having the extended valid period and the like in the authentication information storage section 1038 so as to overwrite the service session ID information and the like before extension of the valid period. In this manner, the authentication processing section 1037 updates the service session ID information and the like temporarily stored at the above-mentioned step SP1023 to the service session ID information having the extended valid period and the like.

Further, the page information generation section 1036 generates video data based on the page information about the music data delivery page. The page information generation section 1036 transmits the generated video data to the display control section 1024.

The display control section 1024 applies a digital-analog conversion process to the video data supplied from the page information generation section 1036. The display control section 1024 then transmits the obtained analog video signal to the display section 1025. As a result, the display section 1025 displays the music data delivery page as a video based on the analog video signal.

(2-7-3) Music Related Service Provision Processes

With reference to FIGS. 22 through 25, the following describes music related service provision processes. These processes occur after completion of the user authentication process performed between the client terminal 1002 and each of the music data delivery server 1004, the trade server 1005, and the radio broadcast information delivery server 1006 as mentioned above with reference to FIG. 21. During a music related service provision process, the client terminal 1002 uses page information about music data delivery pages, package media sales pages, and on-air-list information delivery pages. The client terminal 1002 acquired the page information during the user authentication process from the music data delivery server 1004, the trade server 1005, and the radio broadcast information delivery server 1006. Using that page information and the like, the client terminal 1002 is provided with music data delivery services, trade services, and radio broadcast information delivery services.

(2-7-3-1) Music Data Delivery Service Provision Process

Figure 22:
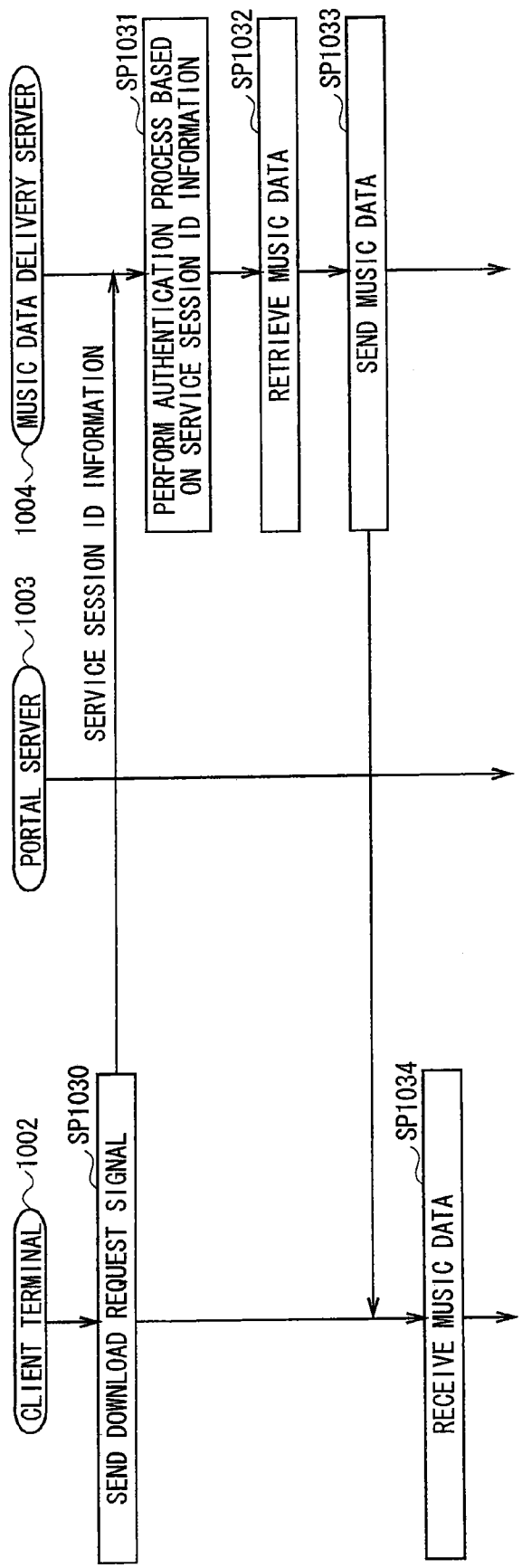
FIG. 22 is a sequence chart showing a music data delivery service provision process.

With reference to FIG. 22, the following describes a music data delivery service provision process. During this process, the client terminal 1002 is provided with music data delivery services from the music data delivery server 1004.

For example, the user uses the input processing section 1021 to enter a control command to select part of the music data delivery page displayed as video on the display section 1025. At step SP1030, the control section 1023 of the client terminal 1002 responds to the entered control command to generate a download request signal that requests to download music data intended for download.

The control section 1023 transmits the download request signal together with service session ID information and the like to the music data delivery server 1004 via the communication control section 1032 and the network interface 1033 in order. The service session ID information and the like are already issued by the music data delivery server 1004 and are temporarily stored in the authentication information storage section 1038.

At step SP1031, the control section 1070 of the music data delivery server 1004 receives the download request signal, the service session ID information, and the like transmitted from the client terminal 1002 via the network interface 1073 and the communication control section 1072 in order. The control section 1070 then transmits the received service session ID information and the like to the authentication processing section 1075.

Under the control of the control section 1070, the authentication processing section 1075 performs the user authentication process. Specifically, the authentication processing section 1075 compares the received service session ID information and the like with the service session ID information and the like temporarily stored in the authentication information storage section 1077.

As a result, the authentication processing section 1075 may authenticate the user to be a registered user who requested to download the music data using the client terminal 1002. In this case, the control section 1070 proceeds to the next step SP1032.

At step SP1032, based on the retrieval key stored in the download request signal, the retrieval section 1079 searches a plurality of pieces of music data in the music data storage section 1078 for music data intended for download, i.e., one matching a retrieval condition indicated by the retrieval key.

Let us assume that the retrieval section 1079 retrieves the music data. The control section 1070 allows the authentication processing section 1075 to extend the valid period for the service session ID information and the like issued to the client terminal 1002. The control section 1070 then proceeds to the next step SP1033.

At step SP1033, the control section 1070 reads the music data intended for download retrieved by the retrieval section 1079 from the music data storage section 1078. In addition, the control section 1070 transmits the read music data intended for download together with the service session ID information and the like to the client terminal 1002 via the communication control section 1072 and the network interface 1073 in order. At this time, the service session ID information has the valid period extended by the authentication processing section 1075.

At step SP1034, the control section 1023 of the client terminal 1002 receives the music data intended for download transmitted from the music data delivery server 1004, the service session ID information having the extended valid period, and the like via the network interface 1033 and the communication control section 1032 in order. The control section 1023 stores the received music data in the storage medium 1029. In addition, the control section 1023 transmits the received service session ID information and the like to the authentication processing section 1037.

Under the control of the control section 1023, the authentication processing section 1037 temporarily stores the received service session ID information having the extended valid period and the like in the authentication information storage section 1038 so as to overwrite the service session ID information and the like before extension of the valid period. In this manner, the authentication processing section 1037 updates the contents of the service session ID information and the like temporarily stored in the authentication information storage section 1038.

In this manner, the client terminal 1002 can download user-specified music data using the music data delivery service provided from the music data delivery server 1004.

(2-7-3-2) Trade Service Provision Process

Figure 23:
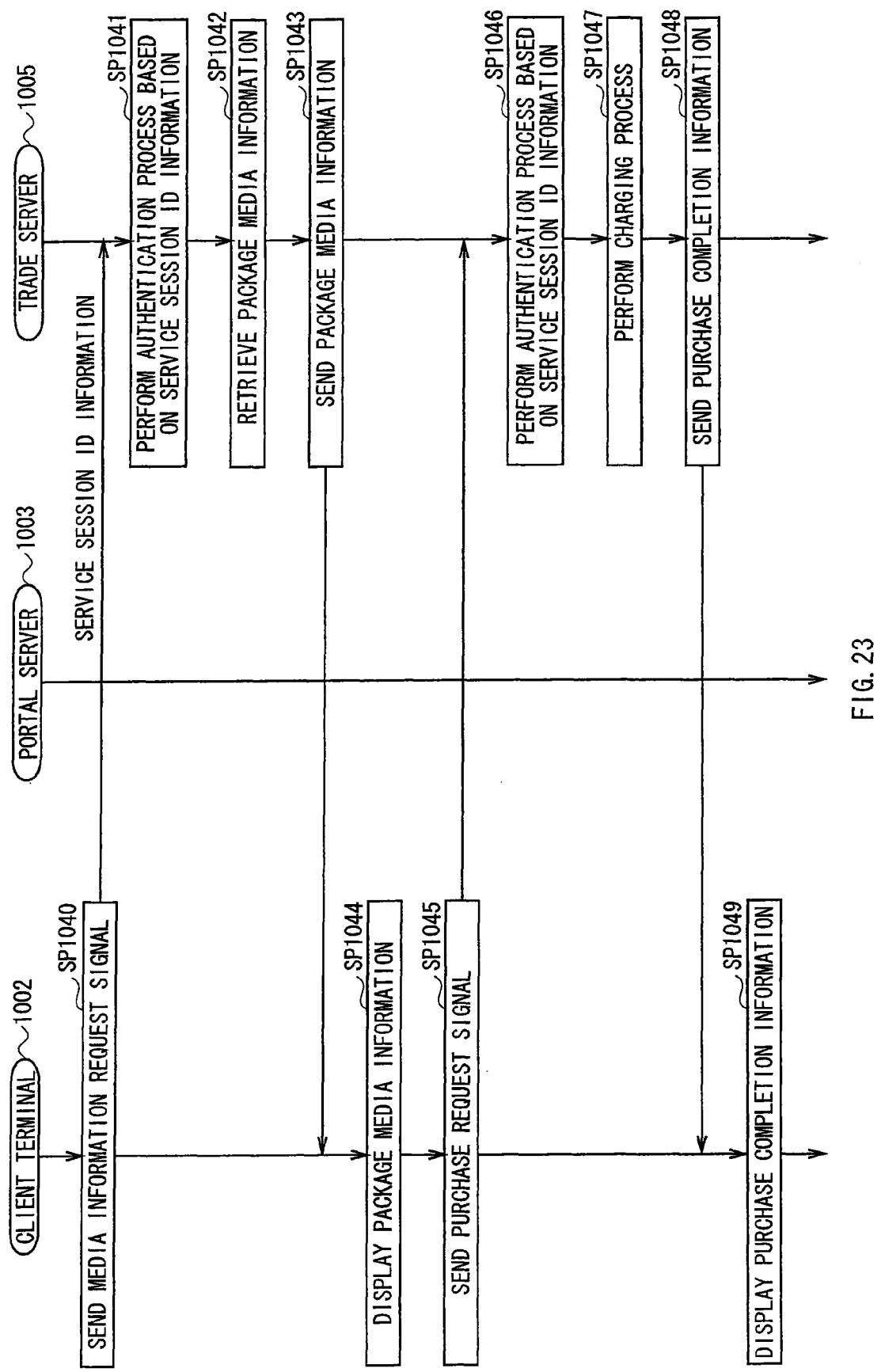
FIG. 23 is a sequence chart showing a trade service provision process.

With reference to FIG. 23, the following describes a trade service provision process during which the client terminal 1002 is provided with trade services from the trade server 1005.

For example, the user uses the input processing section 1021 to enter a control command to select part of the package media sales page displayed as video on the display section 1025. At step SP1040, the control section 1023 of the client terminal 1002 generates a media information request signal that requests package media information about a specific package media corresponding to the entered control command.

The control section 1023 transmits the media information request signal together with service session ID information and the like to the trade server 1005 via the communication control section 1032 and the network interface 1033 in order. The service session ID information and the like are already issued by the trade server 1005 and are temporarily stored in the authentication information storage section 1038.

At step SP1041, the control section 1090 of the trade server 1005 receives the media information request signal, the service session ID information, and the like transmitted from the client terminal 1002 via the network interface 1093 and the communication control section 1092 in order. The control section 1090 then transmits the received service session ID information and the like to the authentication processing section 1095.

Under the control of the control section 1090, the authentication processing section 1095 performs the user authentication process. Specifically, the authentication processing section 1095 compares the received service session ID information and the like with the service session ID information and the like temporarily stored in the authentication information storage section 1097.

As a result, the authentication processing section 1095 may authenticate the user to be a registered user who requested the package media information about the package media using the client terminal 1002. In this case, the control section 1090 proceeds to the next step SP1042.

At step SP1042, based on the retrieval key stored in the media information request signal, the retrieval section 1099 searches a plurality of pieces of package media information in the package media information storage section 1098 for package media information about the specific package media, i.e., one matching a retrieval condition indicated by the retrieval key.

Let us assume that the retrieval section 1099 retrieves the package media information. The control section 1090 allows the authentication processing section 1095 to extend the valid period for the service session ID information and the like issued to the client terminal 1002. The control section 1090 then proceeds to the next step SP1043.

At step SP1043, the control section 1090 reads the package media information retrieved by the retrieval section 1099 from the package media information storage section 1098. In addition, the control section 1090 transmits the read package media information together with the service session ID information and the like to the client terminal 1002 via the communication control section 1092 and the network interface 1093 in order. At this time, the service session ID information has the valid period extended by the authentication processing section 1095.

At step SP1044, the control section 1023 of the client terminal 1002 receives the package media information transmitted from the trade server 1005, the service session ID information having the extended valid period, and the like via the network interface 1033 and the communication control section 1032 in order. The control section 1023 transmits the received package media information to the page information generation section 1036. In addition, the control section 1023 transmits the received service session ID information and the like to the authentication processing section 1037.

Under the control of the control section 1023, the authentication processing section 1037 temporarily stores the received service session ID information having the extended valid period and the like in the authentication information storage section 1038 so as to overwrite the service session ID information and the like before extension of the valid period. In this manner, the authentication processing section 1037 updates the contents of the service session ID information and the like temporarily stored in the authentication information storage section 1038.

The page information generation section 1036 generates video data based on the package media information supplied from the control section 1023. The display control section 1024 converts the generated video data into an analog video signal and transmits it to the display section 1025.

In this manner, the control section 1023 allows the display section 1025 to display the package media information as a video based on the analog video signal. The control section 1023 then proceeds to the next step SP1045.

Let us assume that the user uses the input processing section 1021 to enter a control command to request to purchase a package media corresponding to the package media information displayed as video on the display section 1025. At step SP1045, the control section 1023 responds to the entered control command and generates a purchase request signal to request to purchase the package media.

The control section 1023 transmits the purchase request signal together with service session ID information (i.e., having the extended valid period) and the like to the trade server 1005 via the communication control section 1032 and the network interface 1033 in order. The service session ID information and the like are already received from the trade server 1005 and are temporarily stored in the authentication information storage section 1038.

At step SP1046, the control section 1090 of the trade server 1005 receives the purchase request signal, the service session ID information, and the like transmitted from the client terminal 1002 via the network interface 1093 and the communication control section 1092 in order. The control section 1090 then transmits the received service session ID information and the like to the authentication processing section 1095.

Under the control of the control section 1090, the authentication processing section 1095 performs the user authentication process. Specifically, the authentication processing section 1095 compares the received service session ID information and the like with the service session ID information and the like temporarily stored in the authentication information storage section 1097.

As a result, the authentication processing section 1095 may authenticate the user to be a registered user who requested to purchase the package media using the client terminal 1002. In this case, the control section 1090 proceeds to the next step SP1047.

At step SP1047, the control section 1090 performs purchase processes such as shipping the requested package media to the user of the client terminal 1002. The control section 1090 transmits charging information to the charging server 1008 via the communication control section 1092 and the network interface 1093 in order. The charging information is used to charge the user who purchased the package medium. In this manner, the control section 1090 allows the charging server 1008 to perform a charging process corresponding to the user's purchase of the package medium.

Further, the control section 1090 allows the authentication processing section 1090 to extend the valid period of the service session ID information and the like issued to the client terminal 1002.

After terminating the charging process, at step SP1048, the control section 1090 transmits purchase completion information as well as the service session ID information and the like to the client terminal 1002 via the communication control section 1092 and the network interface 1093 in order. At this time, the purchase completion information indicates completion of the package media purchase process. The authentication processing section 1095 has extended the valid period of the service session ID information.

At step SP1049, the control section 1023 of the client terminal 1002 receives the purchase completion information and the service session ID information and the like via the network interface 1033 and the communication control section 1032 in order. The purchase completion information is transmitted from the trade server 1005. The service session ID information has the extended valid period. The control section 1023 then transmits the received purchase completion information to the page information generation section 1036. In addition, the control section 1023 transmits the service session ID information and the like received from the trade server 1005 to the authentication processing section 1037.

Under the control of the control section 1023, the authentication processing section 1037 temporarily stores the received service session ID information having the extended valid period and the like in the authentication information storage section 1038 so as to overwrite the service session ID information and the like before extension of the valid period. In this manner, the authentication processing section 1037 updates the contents of the service session ID information and the like temporarily stored in the authentication information storage section 1038.

Further, the page information generation section 1036 generates video data based on the purchase completion information supplied from the control section 1023. The display control section 1024 converts the generated video data into an analog video signal and transmits it to the display section 1025.

The control section 1023 allows the display section 1025 to display the purchase completion page as a video based on the analog video signal.

In this manner, the client terminal 1002 can allow the user to purchase intended package media using the trade service provided by the trade server 1005.

(2-7-3-3) On-Air-List Information Delivery Service Provision Process

Figure 24:
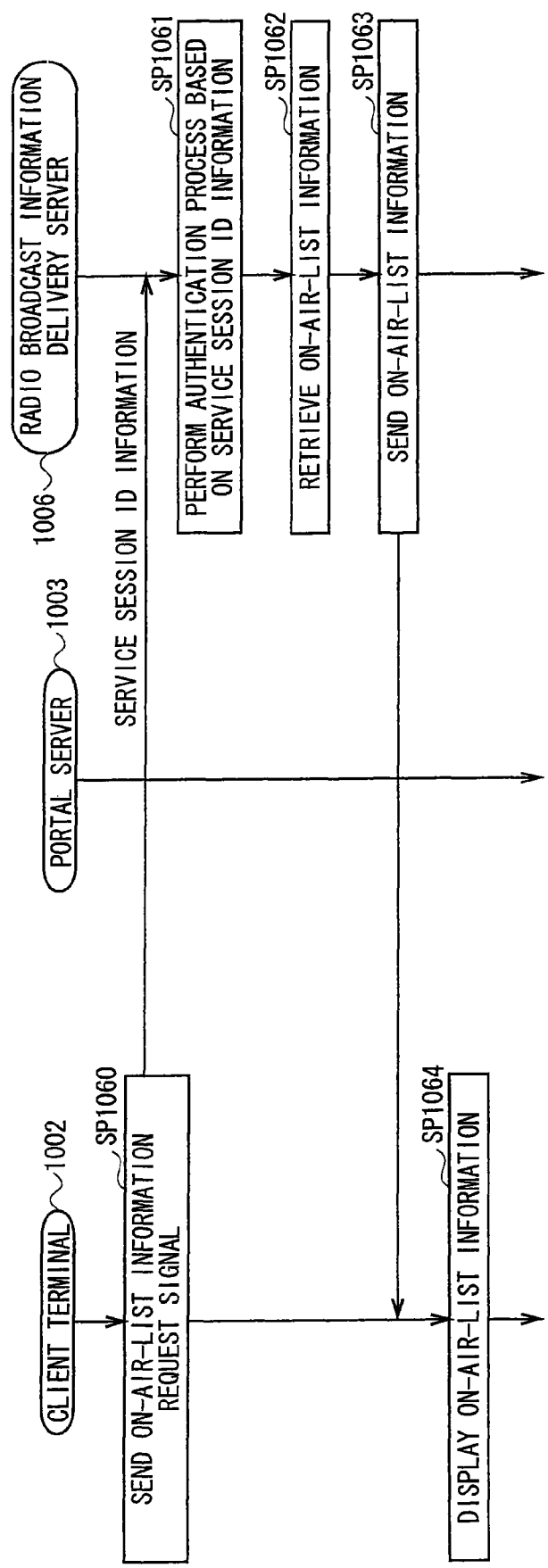
FIG. 24 is a sequence chart showing a radio broadcast information (on-air list information) delivery service provision process (1).

With reference to FIG. 24, the following describes the radio broadcast information delivery service provision process. During this process, the client terminal 1002 is provided with a radio broadcast information delivery service, especially an on-air-list information delivery service from the radio broadcast information delivery server 1006.

For example, the user enters retrieval key to retrieve intended on-air-list information into an input box of the on-air-list information delivery page displayed as a video on the display section 1025. A control command corresponding to a character string indicating the entered retrieval key is input through the input processing section 1021. At step SP1060, the control section 1023 of the client terminal 1002 responds to the entered control command and generates an on-air-list information request signal to request download of the intended on-air-list information.

The control section 1023 sends the on-air-list information request signal together with the service session ID information and the like to the radio broadcast information delivery server 1006 via the communication control section 1032 and the network interface 1033 in order. The service session ID information and the like are already issued by the radio broadcast information delivery server 1006 and are temporarily stored in the authentication information storage section 1038.

At step SP1061, the control section 1110 of the radio broadcast information delivery server 1006 receives the on-air-list information request signal, the service session ID information, and the like sent from the client terminal 1002 via the network interface 1113 and the communication control section 1112 in order. The control section 1110 then sends the received service session ID information and the like to the authentication processing section 1115.

Under the control of the control section 1110, the authentication processing section 1115 performs the user authentication process. Specifically, the authentication processing section 1115 compares the received service session ID information and the like with the service session ID information and the like temporarily stored in the authentication information storage section 1120.

As a result, the authentication processing section 1115 may authenticate the user to be a registered user who requested the on-air-list information using the client terminal 1002. In this case, the control section 1110 proceeds to the next step SP1062.

At step SP1062, based on the retrieval key stored in the on-air-list information request signal, the retrieval section 1118 searches the entire on-air-list information in the on-air-list information storage section 1117 for the targeted on-air-list information within a specified range corresponding to the retrieval condition indicated by the retrieval key.

Let us assume that the retrieval section 1118 retrieves the on-air-list information. The control section 1110 allows the authentication processing section 1115 to extend the valid period for the service session ID information and the like issued to the client terminal 1002. The control section 1110 then proceeds to the next step SP1063.

At step SP1063, the control section 1110 reads the on-air-list information retrieved by the retrieval section 1118 from the on-air-list information storage section 1117. In addition, the control section 1110 sends the read on-air-list information together with the service session ID information and the like to the client terminal 1002 via the communication control section 1112 and the network interface 1113 in order. At this time, the service session ID information has the valid period extended by the authentication processing section 1115.

At step SP1064, the control section 1023 of the client terminal 1002 receives the on-air-list information sent from the radio broadcast information delivery server 1006, the service session ID information having the extended valid period, and the like via the network interface 1033 and the communication control section 1032 in order. The control section 1023 sends the received on-air-list information to the page information generation section 1036. In addition, the control section 1023 sends the service session ID information and the like received from the radio broadcast information delivery server 1006 to the authentication processing section 1037.

Under the control of the control section 1023, the authentication processing section 1037 temporarily stores the received service session ID information having the extended valid period in the authentication information storage section 1038 so as to overwrite the service session ID information having the valid period not extended. In this manner, the authentication processing section 1037 updates the contents of the service session ID information and the like temporarily stored in the authentication information storage section 1038.

The page information generation section 1036 generates video data based on the on-air-list information supplied from the control section 1023. The display control section 1024 converts the generated video data into an analog video signal and sends it to the display section 1025. The display section 1025 displays the on-air-list information as a video based on the analog video signal.

In this manner, the client terminal 1002 can allow the user to acquire intended on-air-list information by using the radio broadcast information delivery service provided by the radio broadcast information delivery server 1006.

(2-7-3-4) Now-On-Air Information Delivery Service Provision Process

Figure 25:
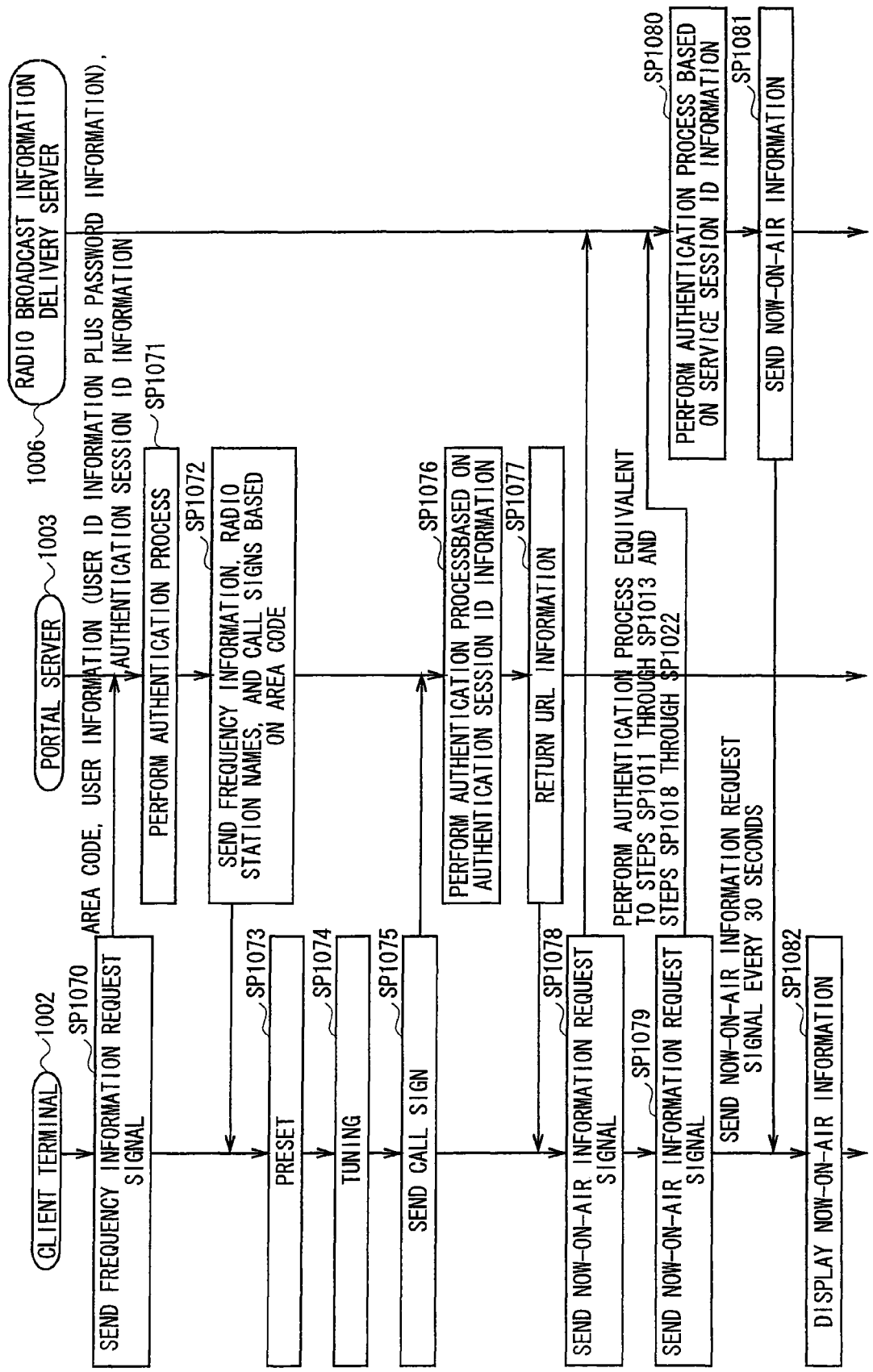
FIG. 25 is a sequence chart showing a radio broadcast information (now-on-air information) delivery service provision process (2).

With reference to FIG. 25, the following describes a radio broadcast information delivery service provision process. During this process, the client terminal 1002 is provided with a radio broadcast information delivery service, especially a now-on-air information delivery service from the radio broadcast information delivery server 1006.

The radio broadcast information delivery server 1006 to supply now-on-air information is provided for each radio station (call sign).

Initially, the client terminal 1002 may not store URL information about the radio broadcast information delivery server 1006 corresponding to each radio station.

The following radio broadcast information delivery service provision process exemplifies a case where the portal server 1003 manages URL information about each radio broadcast information delivery server 1006 for each call sign.

According to the radio broadcast information delivery service provision process, the client terminal 1002 may need to automatically preset a broadcast frequency for each radio station. For this purpose, the client terminal 1002 requests the portal server 1003 for frequency information indicating that broadcast frequency. In such case, it is assumed that the authentication information storage section 1038 does not temporarily store the authentication session ID information and the like. Consequently, the client terminal 1002 first needs to send the user ID information, the password information, and the like to the portal server 1003.

When the input processing section 1021 inputs an operation command to request to automatically preset the broadcast frequency of each radio station. In response to this command, at step SP1070, the control section 1023 of the client terminal 1002 sends a frequency information request signal to request to acquire frequency information about a broadcast frequency which each radio station can receive. The control section 1023 sends the frequency information request signal together with an area code input by the user, the user ID information, the password information, and the like stored in the authentication information storage section 1038 to the portal server 1003 via the communication control section 1032 and the network interface 1033 in order.

At step SP1071, the control section 1050 of the portal server 1003 receives the frequency information request signal, the area code, the user ID information, the password information, and the like sent from the client terminal 1002 via the network interface 1053 and the communication control section 1052 in order. Of these pieces of information, the control section 1050 sends the user ID information, the password information, and the like to the authentication processing section 1056.

Under the control of the control section 1050, the authentication processing section 1056 performs the user authentication process. Specifically, the authentication processing section 1056 compares the received user ID information, the password information, and the like with the customer information registered in the customer database section 1054.

As a result, the authentication processing section 1056 may authenticate the user of the client terminal 1002 to be a registered user. Further, the authentication processing section 1056 may determine that the client terminal 1002 issued a valid request to acquire the frequency information. Under the control of the control section 1050, the authentication processing section 1056 issues the authentication session ID information and the like about the state of communication connection between the client terminal 1002 and the portal server 1003 at the present time. The authentication processing section 1056 temporarily stores the issued authentication session ID information and the like in the authentication information storage section 1057.

The control section 1050 then proceeds to the next step SP1072. At step SP1072, the control section 1050 performs a search based on the area code received from the client terminal 1002. That is to say, the control section 1050 searches a list of a plurality of frequency information, radio station names, and call signs in the frequency information storage section 1058 for those corresponding to the area code and reads them in a list format.

The control section 1050 reads the frequency information, the radio station name, and the call sign in a list form from the frequency information storage section 1058 and sends them along with the authentication session ID information and the like to the client terminal 1002 via the communication control section 1052 and the network interface 1053 in order. The authentication session ID information and the like were issued to the client terminal 1002 by the authentication processing section 1056 at the above-mentioned step SP1071.

At step SP 1073, the control section 1023 of the client terminal 1002 receives the list of frequency information, radio station name, and call sign sent from the portal server

1003 as well as the authentication session ID information and the like via the network interface 1033 and the communication control section 1032 in order. The control section 1023 sends the authentication session ID information and the like received from the portal server 1003 to the authentication processing section 1037. In addition, the control section 1023 sends the list of frequency information, radio station name, and call sign to the display control section 1024.

Under the control of the control section 1023, the authentication processing section 1037 temporarily stores the received authentication session ID information and the like in the authentication information storage section 1038.

The display control section 1024 is supplied with the list of frequency information, radio station name, and call sign from the control section 1023 and sends the list to the display section 1025. The display section 1025 thus displays the list.

At this time, the control section 1023 identifies a selection command supplied from the input processing section 1021. Based on this command, the control section 1023 stores the selected frequency information, radio station name, and call sign as a preset in the storage medium 1029. The control section 1023 then proceeds to the next step SP1074.

At step SP1074, the control section 1023 identifies a tuning control command supplied from the input processing section 1021. Based on this command, the control section 1023 controls the tuner section 1031 so as to extract a radio broadcasting signal from radio broadcasting waves. This radio broadcasting signal should be used for the radio broadcast carried at the broadcast frequency corresponding to the tuning control command.

A broadcast signal reception section 30 receives radio broadcasting waves. Of these radio broadcasting waves, the tuner section 1031 extracts the radio broadcasting signal carried at the broadcast frequency. The tuner section 1031 applies specified reception processes such as decoding to the extracted radio broadcasting signal. As a result, audio data is generated. The tuner section 1031 sends this audio data to the audio control section 1026.

The audio control section 1026 converts the audio data supplied from the tuner section 1031 into an analog audio signal. Then, the audio control section 1026 outputs the analog audio signal to the speaker 1027. The speaker 1027 thus outputs audio of the selected radio program.

At step SP1075, under the control of the control section 1023, the radio broadcasting display control section 1039 reads a call sign from the storage medium 1029. This call sign is stored correspondingly to the frequency information indicating the broadcast frequency corresponding to the above-mentioned tuning control command. The radio broadcasting display control section 1039 sends the read call sign to the portal server 1003 via the communication control section 1032 and the network interface 1033 in order. Likewise, the radio broadcasting display control section 1039 sends authentication session ID information and the like temporarily stored in the authentication information storage section 1038.

At step SP1076, the control section 1050 of the portal server 1003 receives the call sign, the authentication session ID information, and the like sent from the client terminal 1002 via the network interface 1053 and the communication control section 1052 in order. The control section 1050 sends the received authentication session ID information and the like to the authentication processing section 1056.

Under the control of the control section 1050, the authentication processing section 1056 performs the user authentication process. Specifically, the authentication processing section 1056 compares the received authentication session ID information and the like with the received authentication session ID information and the like temporarily stored in the authentication information storage section 1057.

As a result, the authentication processing section 1056 may confirm that the authentication session ID information and the like are received from the client terminal 1002 within the valid period. When the user sent the call sign using the client terminal 1002, the authentication processing section 1056 may authenticate this user to be a registered user. In such case, the control section 1050 proceeds to the next step SP1077.

At step SP1077, the control section 1050 searches a plurality of URL information in the URL storage section 1059 for the URL information corresponding to the call sign based on the call sign received from the client terminal 1002.

The control section 1050 allows the authentication processing section 1056 to extend the valid period of the authentication session ID information and the like issued to the client terminal 1002.

The control section 1050 reads the retrieved URL information from the URL storage section 1059. The control section 1050 sends the read URL information as well as the authentication session ID information and the like having the valid period extended by the authentication processing section 1056 to the client terminal 1002 via the communication control section 1052 and the network interface 1053 in order.

At step SP1078, the control section 1023 of the client terminal 1002 receives the URL information and the authentication session ID information having the extended valid period and the like sent from the portal server 1003 via the network interface 1033 and the communication control section 1032 in order. The control section 1023 sends the received authentication session ID information and the like to the authentication processing section 1037. The control section 1023 sends the URL information to the radio broadcasting display control section 1039.

Under the control of the control section 1023, the authentication processing section 1037 temporarily stores the received authentication session ID information having the extended valid period in the authentication information storage section 1038 to overwrite the authentication session ID information having the valid period not extended. In this manner, the authentication processing section 1037 updates the contents of the authentication session ID information and the like temporarily stored in the authentication information storage section 1038.

Under the control of the control section 1023, the radio broadcasting display control section 1039 temporarily stores the URL information supplied from the control section 1023 in the storage medium 1029 and the like correspondingly to the call sign stored in the storage medium 1029.

Under the control of the control section 1023, the radio broadcasting display control section 1039 follows the URL information temporarily stored in the storage medium 1029 and the like. According to this information, the radio broadcasting display control section 1039 sends a now-on-air information request signal to the radio broadcast information delivery server 1006 via the communication control section 1032 and the network interface 1033 in order. The now-on-air information request signal requests to acquire the now-on-air information. Likewise, the radio broadcasting display control section 1039 sends the service session ID information and the like that are already received from the radio broadcast information delivery server 1006 and are temporarily stored in the authentication information storage section 1038.

In the radio broadcast information delivery service provision process, at step SP1078, the client terminal 1002 sends the now-on-air information request signal, the service session ID information, and the like to the radio broadcast information delivery server 1006. This process corresponds to the process at step SP1010 in FIG. 21 as mentioned above.

Therefore, in the radio broadcast information delivery service provision process, the process at step SP1078 is followed by the user authentication process equivalent to steps SP1011 through SP1013 and steps SP1018 through SP1022 in the client terminal 1002, the radio broadcast information delivery server 1006, and the portal server 1003 as mentioned above with reference to FIG. 21. After these steps are performed in succession, control proceeds to the next step SP1079.

At step SP1079, under the control of the control section 1023, the radio broadcasting display control section 1039 of the client terminal 1002 again follows the URL information temporarily stored in the storage medium 1029 and the like and sends a now-on-air information request signal to the radio broadcast information delivery server 1006 via the communication control section 1032 and the network interface 1033 in order. Likewise, the radio broadcasting display control section 1039 sends the service session ID information and the like that are already received from the radio broadcast information delivery server 1006 and are temporarily stored in the authentication information storage section 1038.

At step SP1080, the control section 1110 of the radio broadcast information delivery server 1006 receives the now-on-air information request signal, the service session ID information, and the like sent from the client terminal 1002 via the network interface 1113 and the communication control section 1112 in order. The control section 1110 sends the received authentication session ID information and the like to the authentication processing section 1115.

Under the control of the control section 1110, the authentication processing section 1115 performs the user authentication process. Specifically, the authentication processing section 1115 compares the received service session ID information and the like with the service session ID information and the like temporarily stored in the authentication information storage section 1120.

As a result, the authentication processing section 1115 may authenticate the user of the client terminal 1002 to be a registered user. In this case, the authentication processing section 1115 determines that the client terminal 1002 issued the valid request to acquire the now-on-air information.

When the authentication processing section 1115 authenticates the user of the client terminal 1002 to be a registered user. In this case, the control section 1110 extends the valid period of the service session ID information and the like issued to the client terminal 1002 by the authentication processing section 1115, and then proceeds to the next step SP1081.

At step SP1081, the control section 1110 reads the now-on-air information from the now-on-air information storage section 1119. The control section 1110 sends the read now-on-air information as well as the service session ID information and the like having the valid period extended by the authentication processing section 1115 to the client terminal 1002 via the communication control section 1112 and the network interface 1113 in order.

At step SP1082, the control section 1023 of the client terminal 1002 receives the now-on-air information and the service session ID information and the like having the extended valid period sent from the radio broadcast information delivery server 1006 via the network interface 1033 and the communication control section 1032 in order. The control section 1023 sends the received service session ID information and the like to the authentication processing section 1037. The control section 1023 sends the now-on-air information to the radio broadcasting display control section 1039.

Under the control of the control section 1023, the authentication processing section 1037 temporarily stores the received service session ID information having the extended valid period and the like in the authentication information storage section 1038 to overwrite the service session ID information having the valid period not extended. In this manner, the authentication processing section 1037 updates the contents of the service session ID information and the like temporarily stored in the authentication information storage section 1038.

Further, the radio broadcasting display control section 1039 sends the now-on-air information supplied from the control section 1023 to the display section 1025 via the display control section 1024. In this manner, the display section 1025 is allowed to display the now-on-air information concerning the radio program in the currently received radio broadcast.

In the radio broadcast information delivery service provision process, the client terminal 1002 thereafter periodically repeats the acquisition request for now-on-air information at step SP1079. The radio broadcast information delivery server 1006 receives the acquisition request from the client terminal 1002 and successively performs the process at steps SP1080 and SP1081.

In this manner, the client terminal 1002 can realtime update the now-on-air information and display it on the display section 1025 of the client terminal 1002. For example, the now-on-air information includes the name of the currently received radio program, the program broadcast start time, the program broadcast end time, the title and artist name of a musical composition currently played in the radio program, and the musical composition broadcast start time.

With the above-mentioned configuration, the content sales system according to the second embodiment can also provide the same effect as for the above-mentioned first embodiment.

According to the description of the above-mentioned first embodiment, the program modules for the client terminal CT (FIG. 7) include the HTTP message program 36 and the communicator program 37. These program modules can implement the same functions as the communication control section 1032 (FIG. 15) of the client terminal 1002 according to the second embodiment.

The content reproduction module 38 (FIG. 7) is a program module capable of implementing the same functions as the encoder/decoder section 1034 (FIG. 15).

The copyright protection information management module 39 (FIG. 7) is a program module capable of implementing the same functions as the copyright management section 1035 (FIG. 15).

The Internet radio channel selection/reproduction module 43 (FIG. 7) is a program module capable of implementing the same functions as the control section 1023 and the audio control section 1026 (FIG. 15).

The musical composition purchase/reproduction module 44 (FIG. 7) is a program module capable of implementing the same functions as the control section 1023 and the audio control section 1026 (FIG. 15).

The XML browser 50 (FIG. 7) is a program module capable of implementing the same functions as the input processing section 1021 and the page information generation section 1036 (FIG. 15).

The hard disk contents controller 42, the database access module 40, and the content data access module 41 (FIG. 7) are program modules capable of implementing the same functions as the control section 1023 (FIG. 15).

The authentication library 47A of the library 47 (FIG. 7) is a program module capable of implementing the same functions as the authentication processing section 1037 and the authentication information storage section 1038 (FIG. 15).

The clip library 47B of the library 47 (FIG. 7) is a program module capable of implementing the same functions as the control section 1023 (FIG. 15).

The associated information display module 45 (FIG. 7) is a program module capable of implementing the same functions as the radio broadcasting display control section 1039 (FIG. 15).

The tuner selection/reproduction/recording module 46 (FIG. 7) is a program module capable of implementing the same functions as the control section 1023, the audio control section 1026, and the tuner section 1031 (FIG. 15).

The audio user interface 51 (FIG. 7) is a program module capable of implementing the same functions as the input processing section 1021, the control section 1023, and the display control section 1024 (FIG. 15).

The CD reproduction module 48 (FIG. 7) is a program module capable of implementing the same functions as the audio control section 1026 and the external recording media recording and reproducing section 1028 (FIG. 15).

The HDD reproduction module 49 (FIG. 7) is a program module capable of implementing the same functions as the control section 1023 and the audio control section 1026 (FIG. 15).

That is to say, the terminal 42 has the hardware circuit block configuration according to the first embodiment as mentioned above. Since the CPU 11 uses various program modules, the terminal 42 can implement the same processes as the client terminal 1002 having the functional circuit block configuration according to the second embodiment.

By the way, in the aforementioned associated information provision server KS (FIG. 3) of the first embodiment, the control section 90 controls each circuit section according to various programs stored in the ROM 91 or the like. Thereby, similar functions to the communication control section 1112, the authentication processing section 1115, the retrieval section 1118, and the like of the radio broadcast information delivery server 1006 (FIG. 19) can be realized. Further, similar functions to the page information storage section 1116, the authentication information storage section 1120, the customer database section 1114, the now-on-air information storage section 1119, the on-air-list information storage section 1117, and the like of the radio broadcast information delivery server 1006 (FIG. 19) and the like can be realized by the CD title information provision database 96, the musical composition information database 93, and the program information database 94, under the control of the control section 90.

Furthermore, in the aforementioned CD seller server 31 (FIG. 4) of the first embodiment, the CPU 110 controls each circuit section according to various programs stored in the ROM 111 or the like. Thereby, similar functions to the communication control section 1092, the authentication processing section 1095, the retrieval section 1099, and the like of the trade server 1005 (FIG. 18) can be realized. Further, similar functions to the authentication information storage section 1097, the package media information storage section 1098, the page information storage section 1096, the customer database section 1094, and the like of the trade server 1005 (FIG. 18) can be realized by the CD retrieval database 113, and the account database 114 of the CD seller server 31 (FIG. 4), under the control of the CPU 110.

(3) Other Embodiments

In the aforementioned embodiments, it has dealt with the case where retrieval results having variety can be obtained by that the client terminal CT transmits a part of associated information representing artist name, the supplier of the associated information, and media identification information as retrieval keys to the CD seller server 31. However, the present invention is not only limited to this but also title may be transmitted as a retrieval key instead of or in addition to the artist name.

In the aforementioned embodiments, it has dealt with the case where the CD seller server 31 reports a part of associated information representing the supplier (radio station name) of the associated information as sales results to the radio station RS. However, the present invention is not only limited to this but also the supplier of the associated information may be transmitted to various contents provision means other than the radio station name, such as television station name, Internet radio station name, and Web site name performing EMD (Electronic Music Distribution).

In the aforementioned embodiments, it has dealt with the case where the CPU 11 expands a communication program previously stored in the ROM 13 on the RAM 20, and executes a retrieval sequence using the aforementioned associated information according to the communication program. However, the present invention is not only limited to this but also a retrieval sequence can be executed by installing program storage media storing a communication program in the client terminal CT.

In the aforementioned embodiments, it has dealt with the case where musical composition information in the table 121 is managed in a directory by the clipping information database 120. However, the present invention is not only limited to this but also retrieval results of CDs provided from the CD seller server 31 may be managed in a directory and displayed. Thereby, the user can comparatively easily search for a desired CD from the varietized many kinds of retrieval results displayed.

In the aforementioned embodiments, it has dealt with the case where associated information about CDs is acquired from the CD title information provision database 96 created in the associated information provision server KS. However, the present invention is not only limited to this but also a CD title information provision database may be previously created and stored in the hard disk drive 21 of the client terminal CT, and associated information may be acquired from the database.

Further, in the aforementioned embodiments, it has dealt with the case where the associated information about CDs is acquired from the CD title information provision database 96 created in the associated information provision server KS. However, the present invention is not only limited to this but also a client terminal may directly access to a dedicated CD title information provision server (not shown) created on the network, and may acquire associated information from the server.

In the aforementioned embodiments, it has dealt with the case where the client terminal CT serving as a communication terminal apparatus according to the present invention is composed of the CPU 11 and the communication processing section 22 serving as request means, the CPU 11 and the hard disk drive 21 serving as associated information acquisition means, and the CPU 11 and the communication processing section 22 serving as search means. However, the present invention is not only limited to this but also a communication terminal apparatus may be formed with various circuit configurations other than this.

In the aforementioned embodiments, radiobroadcast from radio stations has been applied to broadcast that can be received by the client terminals 1002, CT. However, it is not only limited to this but also the client terminal 1002, CT may receive Internet radiobroadcast, satellite radiobroadcast, and the like, and may acquire associated information about it (radiobroadcast information). Also, the client terminal 1002, CT may receive television broadcast by television broadcast stations, and may acquire various broadcast information related to television programs in the television broadcast, from a server on the network.

In the aforementioned embodiments, it has dealt with the case where a hardware circuit block, a function circuit block and a program module are mounted on the client terminals 1002, CT. However, the present invention is not only limited to this but also they may be mounted on various terminals other than the client terminals 1002, CT, such as a portable telephone set, and a personal computer. Similar processing to the aforementioned client terminals 1002, CT can be realized, provided that the terminal have a hardware circuit block, a function circuit block and a program module.

In the aforementioned embodiments, it has dealt with the case where the radio broadcast information delivery server 1006 (associated information provision server KS) is applied to a first server, the trade server 1005 (CD seller server 31) is applied to a second server, and the portal server 1003 is applied to a third server. However, the present invention is not only limited to this but also various configuration other than this may be applied.

INDUSTRIAL UTILIZATION

The communication method according to the present invention can be applied to the purpose of, for example, retrieving a CD based on associated information about musical compositions in a broadcast program.

EXPLANATION OF REFERENCE NUMERALS

1 . . . INFORMATION PROVISION SYSTEM, 2 . . . NETWORK, RS . . . RADIO STATION, KS . . . ASSOCIATED INFORMATION PROVISION SERVER, 31 . . . CD SELLER SERVER, 1000 . . . MUSIC RELATED SERVICE PROVISION SYSTEM, 1002 . . . CLIENT TERMINAL, 1003 . . . PORTAL SERVER, 1004 . . . MUSIC DATA DELIVERY SERVER, 1005 . . . TRADE SERVER, 1006 . . . RADIO BROADCAST INFORMATION DELIVERY SERVER, 1007 . . . INTERNET RADIO SERVER, 1008 . . . CHARGING SERVER.

The invention claimed is:

1. A communication terminal apparatus, comprising:
a request unit configured to request an associated information provision server for associated information about contents broadcast in a broadcasting program being received;
an acquiring unit configured to acquire the associated information corresponding to said request from said associated information provision server;
a storage unit configured to store the associated information; and
a transmitting unit configured to transmit a part of said associated information as retrieval keys for retrieving said contents to a contents retrieval server, and obtaining retrieval results from said contents retrieval server.

2. The communication terminal apparatus according to claim 1, wherein said acquiring unit acquires associated information including contents identification information to identify said contents is acquired from said associated information provision server, and said contents identification information being the part of said associated information is transmitted as said retrieval keys to said contents retrieval server by said transmitting unit.

3. The communication terminal apparatus according to claim 1, wherein said acquiring unit acquires said associated information including broadcasting station identification information to identify a broadcasting station that broadcasts said contents from said associated information provision server, and said transmitting unit transmits said broadcasting station identification information being the part of said associated information as said retrieval keys to said contents retrieval server.

4. The communication terminal apparatus according to claim 1, wherein said acquiring unit acquires said associated information including media identification information showing a kind of recording media storing said contents from said associated information provision server; and
said transmitting unit transmits said media identification information being the part of said associated information as said retrieval keys to said contents retrieval server.

5. The communication terminal apparatus according to claim 1, wherein said acquiring unit acquires said associated information including supplier identification information showing the supplier of said contents from said associated information provision server, and said transmitting unit transmits said supplier identification information being the part of said associated information as said retrieval keys to said contents retrieval server.

6. The communication terminal apparatus according to claim 1, further comprising:
a display unit configured to display said stored associated information based on common keywords by dividing into directories.

* * * * *